United States Patent
McKee et al.

(10) Patent No.: US 12,517,752 B2
(45) Date of Patent: Jan. 6, 2026

(54) SYSTEMS AND METHODS FOR MONITORING ASSETS IN A CLOUD COMPUTING ENVIRONMENT

(71) Applicant: Rapid7, Inc., Boston, MA (US)

(72) Inventors: Trever Allen McKee, Shafter, CA (US); James Andrew Green, Hidden Hills, CA (US)

(73) Assignee: Rapid7, Inc., Boston, MA (US)

(*) Notice: Subject to any disclaimer, the term of this patent is extended or adjusted under 35 U.S.C. 154(b) by 434 days.

(21) Appl. No.: 18/142,857

(22) Filed: May 3, 2023

(65) Prior Publication Data
US 2024/0202020 A1    Jun. 20, 2024

Related U.S. Application Data

(60) Provisional application No. 63/432,950, filed on Dec. 15, 2022.

(51) Int. Cl.
G06F 9/455 (2018.01)

(52) U.S. Cl.
CPC .............. *G06F 9/45558* (2013.01); *G06F 2009/4557* (2013.01); *G06F 2009/45587* (2013.01)

(58) Field of Classification Search
CPC ......... G06F 9/45558; G06F 2009/4557; G06F 2009/45587
USPC ........................................... 726/22
See application file for complete search history.

(56) References Cited

U.S. PATENT DOCUMENTS

| | | | |
|---|---|---|---|
| 7,409,719 B2 | 8/2008 | Armstrong et al. | |
| 9,954,883 B2 * | 4/2018 | Ahuja | H04L 63/1433 |
| 11,431,735 B2 | 8/2022 | Shua | |
| 11,516,222 B1 * | 11/2022 | Srinivasan | G06F 21/577 |
| 2018/0048709 A1 * | 2/2018 | Martini | H04L 63/0209 |
| 2021/0012000 A1 | 1/2021 | Halcrow et al. | |

(Continued)

OTHER PUBLICATIONS

Hirwani et al., Forensic acquisition and analysis of vmware virtual hard disks. SAM'12—The 2012 International Conference on Security and Management. Jul. 2012. 8 pages.

*Primary Examiner* — Frantz B Jean
(74) *Attorney, Agent, or Firm* — Wolf, Greenfield & Sacks, P.C.

(57) ABSTRACT

Techniques for monitoring assets in a cloud computing environment, comprising: collecting datasets for respective assets in the cloud computing environment, each of the datasets comprising at least some data stored by a respective one of the assets at one or multiple timepoints, the datasets including a first dataset for a first asset of the assets; determining priority scores for the assets using: feature values determined using data in the datasets, and feature values determined using data about the assets and stored in the cloud computing environment, wherein the determining comprises: determining, using data in the first dataset that was stored by the first asset at one or more timepoints, at least one first feature value for the first asset; determining, using data about the first asset and stored in the cloud computing environment, at least one second feature value for the first asset; and determining a priority score for the first asset using the at least one first feature value and the at least one second feature value; and collecting further data about at least some of the assets using the determined priority scores.

26 Claims, 9 Drawing Sheets

(56) References Cited

U.S. PATENT DOCUMENTS

2021/0151056 A1* 5/2021 Trim ................ H04L 41/16
2024/0015165 A1* 1/2024 Guy ................ H04L 41/0893

* cited by examiner

Asset Feature Values 253

| | Asset Data Changes 253A | Asset Audit Log Activity 253B | Differences Between Base Asset Image and Current Image 253C | Asset Applications 253D | User-Based Asset Activity 253E | Asset Configuration 253F | Cloud-Based Log Activity 253G | Cloud Computing Resource Type 253H | Asset Deployment Mechanism 253I |
|---|---|---|---|---|---|---|---|---|---|
| Asset 1 | 0 | 2 | 0 | 1 | 1 | 1 | 1 | 1 | 0 |
| Asset 2 | 0 | 1 | 0 | 1 | 0 | 1 | 0 | 1 | 0 |
| Asset 3 | 0 | 0 | 0 | 0 | 0 | 0 | 0 | 0 | 0 |
| Asset 4 | 0 | 1 | 0 | 1 | 0 | 0 | 1 | 0 | 0 |
| Asset 5 | 0 | 2 | 0 | 1 | 1 | 1 | 1 | 1 | 1 |
| Asset 6 | 0 | 1 | 0 | 1 | 1 | 0 | 1 | 1 | 1 |

Priority Calculation After Initial Collection

| | Asset Data Changes | Asset Audit Log Activity | Differences Between Base Asset Image and Current Image | Asset Applications | User Based Asset Activity | Asset Configuration | Cloud-Based Log Activity | Cloud Computing Resource Type | Asset Deployment Mechanism | Asset Priority Score |
|---|---|---|---|---|---|---|---|---|---|---|
| Asset 5 | -1 | 2 | -5 | 3 | 2 | 3 | 1 | 0 | 1 | 6 |
| Asset 1 | -1 | 2 | -5 | 3 | 2 | 3 | 1 | 0 | -2 | 3 |
| Asset 6 | -1 | 1 | -5 | 3 | 2 | 0 | 1 | 0 | 1 | 2 |
| Asset 2 | -1 | 1 | -5 | 3 | 0 | 3 | 0 | -3 | -2 | -4 |
| Asset 4 | -1 | 1 | -5 | 3 | 0 | 0 | 0 | 3 | -2 | -7 |
| Asset 3 | -1 | 0 | -5 | 0 | 0 | 0 | 0 | -3 | -2 | -11 |

FIG. 7

Priority Calculation After Second Collection

| | Asset Data Changes | Asset Audit Log Activity | Differences Between Base Asset Image and Current Image | Asset Applications | User Based Asset Activity | Asset Configuration | Cloud-Based Log Activity | Cloud Computing Resource Type | Asset Deployment Mechanism | Asset Priority Score |
|---|---|---|---|---|---|---|---|---|---|---|
| Asset 5 | 3 | 2 | 1 | 3 | 2 | 3 | 1 | 0 | 1 | 16 |
| Asset 1 | 3 | 2 | -5 | 3 | 2 | 3 | 1 | 0 | -2 | 7 |
| Asset 2 | -1 | 0 | -5 | 3 | 2 | 0 | 1 | 0 | 2 | -1 |
| Asset 6 | -1 | 0 | -5 | 3 | 0 | 3 | 0 | 0 | -2 | -5 |
| Asset 3 | -1 | 1 | -5 | 0 | 2 | 0 | 0 | -3 | -2 | -6 |
| Asset 4 | -1 | 1 | -5 | 3 | 0 | 0 | 0 | -3 | -2 | -7 |

SYSTEMS AND METHODS FOR MONITORING ASSETS IN A CLOUD COMPUTING ENVIRONMENT

CROSS-REFERENCE TO RELATED APPLICATIONS

This application claims the benefit of priority under 35 U.S.C. 119(e) to U.S. Provisional Patent Application Ser. No. 63/432,950, filed on Dec. 15, 2022, and titled, "SYSTEMS AND METHODS FOR MONITORING ASSETS IN A CLOUD COMPUTING ENVIRONMENT," which is incorporated by reference herein in its entirety.

BACKGROUND

Cloud computing enables the delivery of software, data, and other computing resources to remote devices and computing locations. A cloud computing environment may contain many physical and virtual assets which communicate via various computer network protocols. The physical and virtual assets may host various data and software applications. Providing cloud computing security is important to protect the data, software applications, virtual assets, physical assets, and other infrastructure of a cloud computing environment.

Cloud computing security is important to provide in various types of cloud computing environments including private cloud computing environments (e.g., cloud infrastructure operated for one organization), public cloud computing environments (e.g., cloud infrastructure made available for use by others, for example, over the Internet or any other network, e.g., via subscription, to multiple organizations), a hybrid cloud computing environment (a combination of publicly-accessible and private infrastructure) and/or using any other type of cloud computing environment. Non-limiting examples of cloud computing environments include GOOGLE Cloud Platform (GCP), ORACLE Cloud Infrastructure (OCI), AMAZON Web Services (AWS), IBM Cloud, and MICROSOFT Azure.

SUMMARY

Some embodiments provide for a method for monitoring assets in a cloud computing environment, the method comprising using at least one computer hardware processor to perform: (A) collecting a plurality of datasets for a respective plurality of assets in the cloud computing environment, each of the plurality of datasets comprising at least some data stored by a respective one of the plurality of assets at one or multiple timepoints, the plurality of datasets including a first dataset for a first asset in the plurality of assets; (B) determining priority scores for the plurality of assets using: (a) feature values determined using data in the plurality of datasets, and (b) feature values determined using data about the plurality of assets and stored in the cloud computing environment, wherein the determining comprises: determining, using data in the first dataset that was stored by the first asset at one or more timepoints, at least one first feature value for the first asset; determining, using data about the first asset and stored in the cloud computing environment, at least one second feature value for the first asset; and determining a priority score for the first asset using the at least one first feature value and the at least one second feature value; and (C) collecting further data about at least some of the plurality of assets using the determined priority scores.

Some embodiments provide for a system for monitoring assets in a cloud computing environment, the system comprising: at least one computer hardware processor; and at least one non-transitory computer-readable storage medium storing processor-executable instructions that, when executed by the at least one computer hardware processor, causes the at least one computer hardware processor to perform a method comprising: (A) collecting a plurality of datasets for a respective plurality of assets in the cloud computing environment, each of the plurality of datasets comprising at least some data stored by a respective one of the plurality of assets at one or multiple timepoints, the plurality of datasets including a first dataset for a first asset in the plurality of assets; (B) determining priority scores for the plurality of assets using: (a) feature values determined using data in the plurality of datasets, and (b) feature values determined using data about the plurality of assets and stored in the cloud computing environment, wherein the determining comprises: determining, using data in the first dataset that was stored by the first asset at one or more timepoints, at least one first feature value for the first asset; determining, using data about the first asset and stored in the cloud computing environment, at least one second feature value for the first asset; and determining a priority score for the first asset using the at least one first feature value and the at least one second feature value; and (C) collecting further data about at least some of the plurality of assets using the determined priority scores.

Some embodiments provide for at least one non-transitory computer-readable storage medium storing processor-executable instructions that, when executed by at least one computer hardware processor, causes the at least one computer hardware processor to perform a method for monitoring assets in a cloud computing environment, the method comprising: (A) collecting a plurality of datasets for a respective plurality of assets in the cloud computing environment, each of the plurality of datasets comprising at least some data stored by a respective one of the plurality of assets at one or multiple timepoints, the plurality of datasets including a first dataset for a first asset in the plurality of assets; (B) determining priority scores for the plurality of assets using: (a) feature values determined using data in the plurality of datasets, and (b) feature values determined using data about the plurality of assets and stored in the cloud computing environment, wherein the determining comprises: determining, using data in the first dataset that was stored by the first asset at one or more timepoints, at least one first feature value for the first asset; determining, using data about the first asset and stored in the cloud computing environment, at least one second feature value for the first asset; and determining a priority score for the first asset using the at least one first feature value and the at least one second feature value; and (C) collecting further data about at least some of the plurality of assets using the determined priority scores.

In some embodiments, determining the at least one first feature value for the first asset comprises using the first dataset to determine: a feature value indicative of a degree of change in data stored by the first asset at multiple timepoints; a feature value indicative of a degree of change between a base image of the first asset in the first dataset and a subsequent image of the first asset in the first dataset; a feature value indicative of a degree of audit log activity; and/or a feature value indicative of a number and/or type of software applications installed on the first asset.

In some embodiments, determining the at least one first feature value for the first asset comprises determining the feature value indicative of the degree of change in the data stored by the first asset at multiple timepoints, the first dataset comprises a first version of the data stored by the first asset at a first timepoint and a second version of the data stored by the first asset at a second timepoint different from the first timepoint, and determining the feature value indicative of the degree of change comprises comparing the first version of the data and the second version of the data.

In some embodiments, the first version of the data comprises first security-related data, the second version of the data comprises second security-related data, and comparing the first version of the data and the second version of the data comprises determining a degree of change between the first security-related data and the second security-related data.

In some embodiments, determining the at least one first feature value for the first dataset comprises determining the feature value indicative of the degree of change between the base image of the first asset in the first dataset and the subsequent image of the first asset in the first dataset, the first dataset comprises the base image and the subsequent image, and determining the feature value indicative of the degree of change between the base image and the subsequent image comprises comparing the base image with the subsequent image.

In some embodiments, the base image comprises first security-related data, the subsequent image comprises second security-related data, and comparing the base image with the subsequent image comprises determining a degree of change between the first security-related data and the second security-related data.

In some embodiments, determining the at least one first feature value for the first dataset comprises determining the feature value indicative of the degree of audit log activity, the first dataset comprises at least one log obtained from the first asset, and determining the degree of audit log activity comprises determining a number of user accesses reflected in the at least one log.

In some embodiments, determining the at least one first feature value for the first dataset comprises determining the feature value indicative of the number and/or the type of software applications installed on the first asset.

In some embodiments, the feature value indicative of the number and/or type of software applications is indicative of whether there are any software applications installed on the first asset with which a user can interact.

In some embodiments, determining the at least one second feature value for the first asset comprises using the data about the first asset and stored in the cloud computing environment to determine: a feature value indicative of user activity with respect to the first asset; a feature value indicative of a degree of activity in at least one cloud-based log associated with the first asset; a feature value indicative of a cloud computing resource type for the first asset; a feature value indicative of network and/or software configuration of first asset; and/or a feature value indicative of a mechanism of deployment of the first asset.

In some embodiments, determining the at least one second feature value for the second dataset comprises determining the feature value indicative of user activity with respect to the first asset. In some embodiments, determining the feature value indicative of user activity with respect to the first asset comprises determining whether one or more users changed a security configuration of the first asset.

In some embodiments, determining the at least one second feature value for the second dataset comprises determining the feature value indicative of the degree of activity in the at least one cloud-based log associated with the first asset, the at least one cloud-based log being part of the data about the first asset and stored in the cloud computing environment.

In some embodiments, the feature value indicative of the degree of activity in the at least one cloud-based log indicates a number and/or type of software packages installed on, modified on, and/or removed from the first asset.

In some embodiments, determining the at least one second feature value for the second dataset comprises determining the feature value indicative of the cloud computing resource type for the first asset.

In some embodiments, the first asset is a virtual machine, the feature value indicative of the cloud computing resource type for the first asset indicates whether the virtual machine (VM) launched as a standalone VM resource or as an instance of a group VM resource.

In some embodiments, the group VM resource is an autoscaling group resource, an EKS cluster resource, an ECS cluster resource, or an EMR cluster resource.

In some embodiments, determining the at least one second feature value for the second dataset comprises determining the feature value indicative of network and/or software configuration of first asset.

In some embodiments, determining the at least one second feature value for the second dataset comprises determining the feature value indicative of the mechanism of deployment of the first asset, wherein the mechanism of deployment of the first asset is manual deployment or automated deployment by cloud-based software.

In some embodiments, the at least one first feature value includes a first plurality of feature values, the at least one second feature value includes a second plurality of feature values, and determining a priority score for the first asset comprises: determining a priority score contribution value for each feature in the first plurality of feature values and for each feature in the second plurality of feature values; and determining the priority score from the determined priority score contribution values.

In some embodiments, the collecting comprises: identifying the at least some of the plurality of assets using the determined scores; and collecting the further data from the at least some of the plurality of assets.

In some embodiments, the method includes, after collecting further data from at least some of the plurality of assets, analyzing the further data to detect presence of one or more security risks.

In some embodiments, the method includes, in response to detecting a security risk, recommending one or more corrective actions to a user, or automatically taking a corrective action to address the security risk.

In some embodiments, the plurality of datasets includes a second dataset for a second asset in the plurality of assets, the second asset being different from the first asset, and determining the priority scores further comprises: determining, using data in the second dataset that was stored by the second asset at one or more timepoints, at least one third feature value for the second asset; determining, using data about the second asset and stored in the cloud computing environment, at least one fourth feature value for the second asset; and determining a priority score for the second asset using the at least one third feature value and the at least one fourth feature value.

Some embodiments provide for method for monitoring assets in a computer network environment, the method comprising using at least one computer hardware processor to perform: collecting a plurality of datasets for a respective plurality of assets in the computer network environment, each of the plurality of datasets comprising at least some data stored by a respective one of the plurality of assets at one or multiple timepoints, the plurality of datasets including a first dataset for a first asset in the plurality of assets; determining priority scores for the plurality of assets using: (a) feature values determined using data in the plurality of datasets, and (b) feature values determined using data about the plurality of assets and stored in the computer network environment, wherein the determining comprises: determining, using data in the first dataset that was stored by the first asset at one or more timepoints, at least one first feature value for the first asset; determining, using data about the first asset and stored in the computer network environment, at least one second feature value for the first asset; and determining a priority score for the first asset using the at least one first feature value and the at least one second feature value; and collecting further data about at least some of the plurality of assets using the determined priority scores.

Some embodiments provide for a system for monitoring assets in a computer network environment, the system comprising: at least one computer hardware processor; and at least one non-transitory computer-readable storage medium storing processor-executable instructions that, when executed by the at least one computer hardware processor, causes the at least one computer hardware processor to perform a method comprising: collecting a plurality of datasets for a respective plurality of assets in the computer network environment, each of the plurality of datasets comprising at least some data stored by a respective one of the plurality of assets at one or multiple timepoints, the plurality of datasets including a first dataset for a first asset in the plurality of assets; determining priority scores for the plurality of assets using: (a) feature values determined using data in the plurality of datasets, and (b) feature values determined using data about the plurality of assets and stored in the computer network environment, wherein the determining comprises: determining, using data in the first dataset that was stored by the first asset at one or more timepoints, at least one first feature value for the first asset; determining, using data about the first asset and stored in the computer network environment, at least one second feature value for the first asset; and determining a priority score for the first asset using the at least one first feature value and the at least one second feature value; and collecting further data about at least some of the plurality of assets using the determined priority scores.

Some embodiments provide for at least one non-transitory computer-readable storage medium storing processor-executable instructions that, when executed by at least one computer hardware processor, causes the at least one computer hardware processor to perform a method for monitoring assets in a computer network environment, the method comprising: collecting a plurality of datasets for a respective plurality of assets in the computer network environment, each of the plurality of datasets comprising at least some data stored by a respective one of the plurality of assets at one or multiple timepoints, the plurality of datasets including a first dataset for a first asset in the plurality of assets; determining priority scores for the plurality of assets using: (a) feature values determined using data in the plurality of datasets, and (b) feature values determined using data about the plurality of assets and stored in the computer network environment, wherein the determining comprises: determining, using data in the first dataset that was stored by the first asset at one or more timepoints, at least one first feature value for the first asset; determining, using data about the first asset and stored in the computer network environment, at least one second feature value for the first asset; and determining a priority score for the first asset using the at least one first feature value and the at least one second feature value; and collecting further data about at least some of the plurality of assets using the determined priority scores.

Some embodiments provide for a method for monitoring resources in a computer network environment, the method comprising using at least one computer hardware processor to perform: collecting a plurality of datasets for a respective plurality of resources in the computer network environment, each of the plurality of datasets comprising at least some data stored by a respective one of the plurality of resources at one or multiple timepoints, the plurality of datasets including a first dataset for a first resource in the plurality of resources; determining priority scores for the plurality of resources using: (a) feature values determined using data in the plurality of datasets, and (b) feature values determined using data about the plurality of resources and stored in the computer network environment, wherein the determining comprises:

determining, using data in the first dataset that was stored by the first resource at one or more timepoints, at least one first feature value for the first resource; determining, using data about the first resource and stored in the computer network environment, at least one second feature value for the first resource; and determining a priority score for the first resource using the at least one first feature value and the at least one second feature value; and collecting further data about at least some of the plurality of resources using the determined priority scores.

Some embodiments provide for a system for monitoring resources in a computer network environment, the system comprising: at least one computer hardware processor; and at least one non-transitory computer-readable storage medium storing processor-executable instructions that, when executed by the at least one computer hardware processor, causes the at least one computer hardware processor to perform a method comprising: collecting a plurality of datasets for a respective plurality of resources in the computer network environment, each of the plurality of datasets comprising at least some data stored by a respective one of the plurality of resources at one or multiple timepoints, the plurality of datasets including a first dataset for a first resource in the plurality of resources; determining priority scores for the plurality of resources using: (a) feature values determined using data in the plurality of datasets, and (b) feature values determined using data about the plurality of resources and stored in the computer network environment, wherein the determining comprises: determining, using data in the first dataset that was stored by the first resource at one or more timepoints, at least one first feature value for the first resource; determining, using data about the first resource and stored in the computer network environment, at least one second feature value for the first resource; and determining a priority score for the first resource using the at least one first feature value and the at least one second feature value; and collecting further data about at least some of the plurality of resources using the determined priority scores.

Some embodiments provide for at least one non-transitory computer-readable storage medium storing processor-executable instructions that, when executed by at least one computer hardware processor, causes the at least one computer hardware processor to perform a method for monitoring resources in a computer network environment, the method comprising: collecting a plurality of datasets for a respective plurality of resources in the computer network environment, each of the plurality of datasets comprising at least some data stored by a respective one of the plurality of resources at one or multiple timepoints, the plurality of datasets including a first dataset for a first resource in the plurality of resources; determining priority scores for the plurality of resources using: (a) feature values determined using data in the plurality of datasets, and (b) feature values determined using data about the plurality of resources and stored in the computer network environment, wherein the determining comprises:

determining, using data in the first dataset that was stored by the first resource at one or more timepoints, at least one first feature value for the first resource; determining, using data about the first resource and stored in the computer network environment, at least one second feature value for the first resource; and determining a priority score for the first resource using the at least one first feature value and the at least one second feature value; and collecting further data about at least some of the plurality of resources using the determined priority scores.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 4B is a table which contains asset feature values determined by corresponding feature value calculators, in accordance with some embodiments of the technology described herein.

FIG. 6 is a table which contains asset priority scores and asset priority score component values calculated by an example information security system after an initial asset collection, in accordance with some embodiments of the technology described herein.

FIG. 7 is a table which contains asset priority scores and asset priority score component values calculated by an example information security system after a second asset collection, in accordance with some embodiments of the technology described herein.

DETAILED DESCRIPTION

Figure 1:
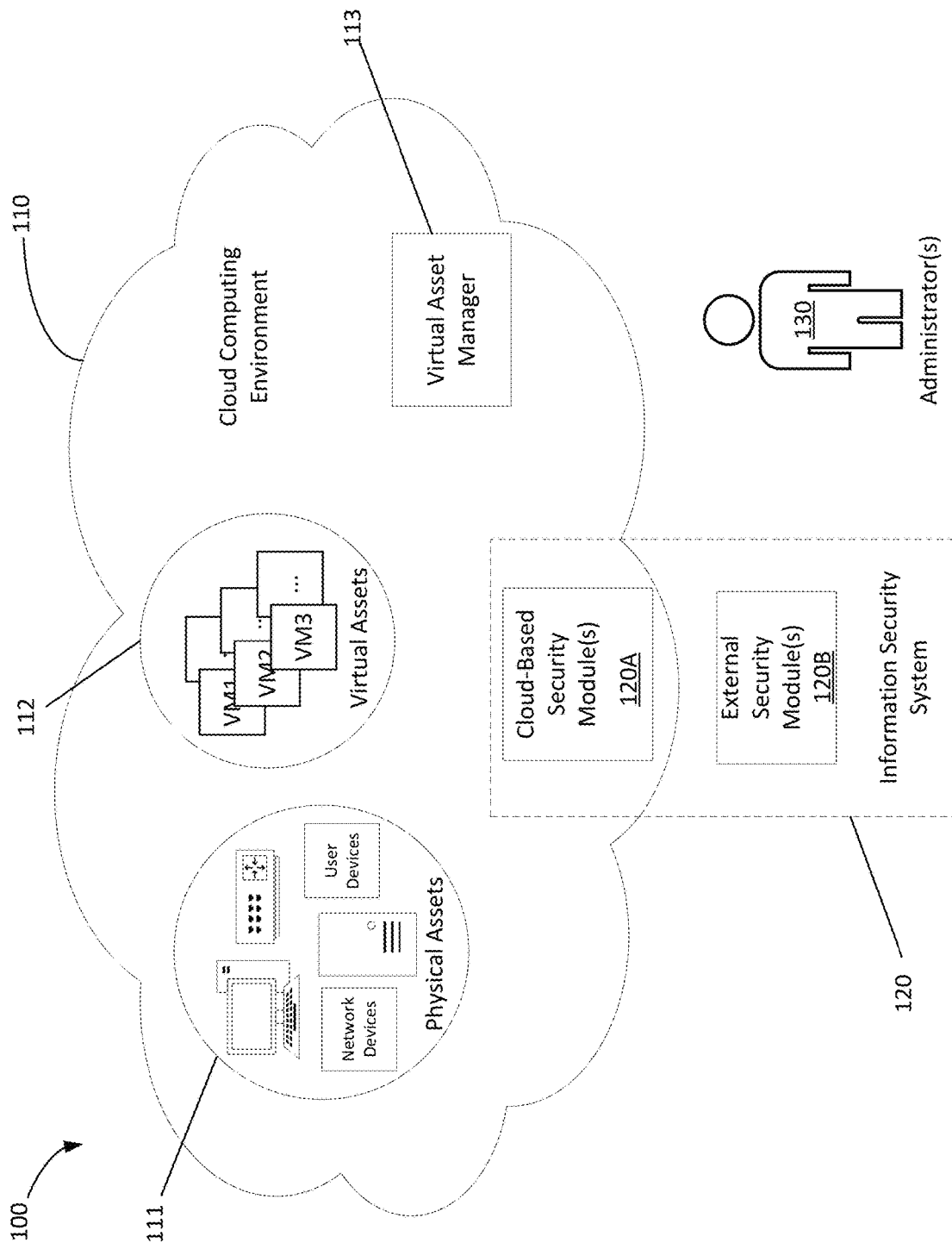
FIG. 1 shows an illustrative environment 100 in which an information security system may operate, in accordance with some embodiments of the technology described herein.

As discussed above, it is important to provide security in the context of cloud computing environments to protect the data, software, and infrastructure of such environments. One aspect of providing cloud computing environment security is monitoring the physical and virtual assets within the cloud computing environment to detect security vulnerabilities (e.g., malware, viruses, outdated or not-up-to-date software, misconfigurations, etc.). Monitoring physical and virtual assets within a cloud computing environment involves collecting data from the cloud computing environment and analyzing it for the presence of such security risks.

The inventors have recognized that conventional techniques for monitoring physical and virtual assets within a cloud computing environment may be improved upon. Some conventional monitoring techniques are agent-based, with software agents installed on assets that push data from the assets to an information security system that analyzes the received data for the presence of security risks. However, the logistics of installing such local agents are not simple—requiring permissions, which many cloud computing environment users are not willing to grant. In addition, executing local agents can have deleterious effects on the execution of other software on the same assets, which is not desirable.

Other conventional monitoring techniques pull data stored by the assets by collecting snapshots of the data at set time intervals. This may involve, for example, taking a full snapshot of every virtual machine (e.g., downloading the contents of the entire "disk" of a virtual machine at a specific point in time) in a cloud computing environment, transferring these data for subsequent analysis, storing these data, and finally analyzing these data for the presence of security risks. When monitoring security risks for a cloud deployment for a particular company (e.g., a medium or large enterprise), each such collection frequently involves transmission, storage, and analysis of a voluminous amount of data (e.g., gigabytes to terabytes of data at every collection cycle). As a result, systems that implement such conventional techniques are extremely inefficient. That means such systems unnecessarily consume computing resources (e.g., computer network, memory, storage, and processing resources), which could be utilized in other ways or simply left unused saving energy.

The inventors have recognized that conventional "pull" monitoring techniques may be improved by reducing the amount of data gathered during asset monitoring collections. The inventors have appreciated that data stored by and software executing on some of the monitored assets (e.g., data and software executing on a physical computing device, a virtual machine, a virtual container, etc.) may not change between collections and, even if there are changes, such changes may not relate to any security risks (e.g., a user's edits to an Excel spreadsheet made as part of routine use of that software application).

Accordingly, the inventors have developed a new technique for identifying assets from which data is to be collected such that data need not be collected from every asset each time assessment of security risks is performed (e.g., whether according to a fixed schedule or dynamically determined times). The technique involves gathering information about assets and using that information to identify those cloud computing environment assets from which it is more important to collect data. Specifically, the gathered information is used to prioritize the assets (e.g., by determining priority scores for the assets) for collection; data is collected from assets (e.g., by collecting full or partial "snapshots" of each asset) having higher priorities (e.g., the k top priorities, where k is a configurable integer). As a result of prioritizing data collection, and unlike conventional monitoring techniques, the techniques developed by the inventors substantially reduce the data generated during a collection and consequently reduce wasted computer and network bandwidth, increase the velocity of asset security assessment, and lower the costs associated with information security monitoring.

In some embodiments, a full snapshot of an asset, sometimes called a full image, contains the contents of the entire "disk" of an asset at a specific point in time. A partial snapshot of an asset, sometimes called a partial image, contains a portion of the contents of a "disk" of an asset at a specific point in time.

In some embodiments, the information gathered about individual assets that is used to prioritize collection includes two types of features: so-called "internal" features and "external" features. Internal features for a particular asset are those features whose values are determined (e.g., only) using data stored by the particular asset at one or more timepoints. Data for calculating values of internal features may be obtained by accessing the data stored by the particular asset itself. External features for a particular asset are those features whose values are determined (e.g., only) using data about the particular asset and stored in the cloud computing environment. Data for calculating values of external features may be obtained using an API of the cloud computing environment (e.g., the API of GCP, OCI, AWS, IBM Cloud or Azure).

Non-limiting examples of "internal" feature values one or more of which may be calculated for a particular asset include: a feature value indicative of a degree of change in data stored by the particular asset at multiple timepoints, a feature value indicative of a degree of change between a base and a subsequent image of the particular asset, a feature value indicative of a degree of audit log activity, and a feature value indicative of a number and/or type of software applications installed on the particular asset.

Non-limiting examples of "external" feature values one or more of which may be calculated for a particular asset include: include a feature value indicative of user activity with respect to the particular asset, a feature value indicative of a degree of activity in at least one cloud-based log associated with the particular asset, a feature value indicative of a cloud computing resource type for the particular asset, a feature value indicative of network and/or software configuration of the particular asset; and/or a feature value indicative of a mechanism of deployment of the particular asset.

The inventors have recognized that prioritizing asset collection using a combination of both external and internal feature values (computed for individual assets being prioritized) may result in more efficient asset collection (e.g., taking less time, using less network bandwidth, and fewer computing resources) than asset collection in which prioritization is performed using only internal or only external feature values. Accordingly, in some embodiments, prioritization of assets for collection may be determined by computing for each of one or more particular assets a priority score using both: at least one (e.g., one, two three, four, five, etc.) internal feature value and at least one (e.g., one, two three, four, five etc.) external feature value. This provides a more holistic view of the security posture of the cloud computing environment and helps to more accurately identify assets from which data (e.g., a snapshot) is to be collected.

Accordingly, some embodiments, provide for a method for monitoring (e.g., physical and/or virtual) assets in a cloud computing environment, the method comprising: (A) collecting a plurality of datasets for a respective plurality of assets in the cloud computing environment, each of the plurality of datasets comprising at least some data stored by a respective one of the plurality of assets at one or multiple timepoints, the plurality of datasets including a first dataset for a first asset in the plurality of assets; (B) determining priority scores for the plurality of assets using: (a) feature values (e.g., "internal" feature values) determined using data in the plurality of datasets, and (b) feature values (e.g., "external" feature values) determined using data about the plurality of assets and stored in the cloud computing environment, wherein the determining comprises: (i) determining, using data in the first dataset that was stored by the first asset at one or more timepoints, at least one first (e.g., "internal") feature value for the first asset; (ii) determining, using data about the first asset and stored in the cloud computing environment, at least one second (e.g., "external") feature value for the first asset; and (iii) determining a priority score for the first asset using the at least one first feature value and the at least one second feature value; and (C) collecting further data about at least some of the plurality of assets using the determined priority scores.

In some embodiments, determining the at least one (e.g., "internal") first feature value for the first asset comprises using the first dataset to determine: a feature value indicative of a degree of change in data stored by the first asset at multiple timepoints, a feature value indicative of a degree of change between a base and a subsequent image of the first asset in the first dataset, a feature value indicative of a degree of audit log activity, and/or a feature value indicative of a number and/or type of software applications installed on the first asset.

In some embodiments, determining the at least one first feature value for the first asset comprises determining the feature value indicative of the degree of change in the data stored by the first asset at multiple timepoints, the first dataset comprises a first version of the data stored by the first asset at a first timepoint and a second version of the data stored by the first asset at a second timepoint different from the first timepoint, and determining the feature value indicative of the degree of change comprises comparing the first version of the data and the second version of the data.

In some embodiments, the first version of the data comprises first security-related data, the second version of the data comprises second security-related data, and comparing the first version of the data and the second version of the data comprises determining (e.g., only) a degree of change between the first security-related data and the second security-related data.

In some embodiments, security-related data may include (e.g., consist of) data related to the security configuration of an asset. The security-related data for an asset may be stored on the asset. For example, security-related data for an asset may include permissions data specifying permissions with respect to the asset and/or modification of data on the asset (e.g., create, read, write, update, delete, login, access permissions). As another example, security-related data for an asset may include any personally identifiable information stored on the asset. As another example, security-related data for an asset may include any security-related logs (e.g., login logs, system logs, etc.) stored on the asset. As another example, security-related data for an asset may include metadata about software applications installed on the asset; the metadata may indicate a number of software applications installed on the asset, types of software applications installed on the asset, and/or historical data indicating when each of one or more software applications was installed, updated, and/or removed from the asset. As yet another example, security-related data for an asset may include one or more system configurations (e.g., the configurations of any devices, network configurations, operating system configurations, etc.).

It should be appreciated that not all data stored on an asset constitutes "security-related" data. Indeed, a substantial amount of activity with respect to an asset is usually not related to security and, instead, is usual activity associated with execution of various software programs executing on the asset. For example, software application logs documenting regular activity of the software applications (e.g., a web server that is continually logging its ongoing activity) do not constitute "security-related" data. As another example, data indicating the normal setup and teardown of interface devices does not constitute "security-related" data.

In some embodiments, determining the at least one first feature value for the first dataset comprises determining the feature value indicative of the degree of change between the base image of the first asset in the first dataset and the subsequent image of the first asset in the first dataset, the first dataset comprises the base image and the subsequent image, and determining the feature value indicative of the degree of change between the base image and the subsequent image comprises comparing the base image with the subsequent image.

In some embodiments, the base image comprises first security-related data, the subsequent image comprises second security-related data, and comparing the base image with the subsequent image comprises determining a degree of change (e.g., only) between the first security-related data and the second security-related data.

In some embodiments, determining the at least one first feature value for the first dataset comprises determining the feature value indicative of the degree of audit log activity, the first dataset comprises at least one log obtained from the first asset, and wherein determining the degree of audit log activity comprises determining a number of user accesses reflected in the at least one log.

In some embodiments, the at least one log may be any log stored in the first asset that provides a record of activities that occurred in the first asset. The at least one log may provide a record of security-related activities that occurred in the first asset. The activities may include any activity that affected at any time a specific, operation, procedure, event, or device associated with the first asset. One example of at least one log may be a "Bash log" that provides a chronological history of commands invoked by a user. Another example of at least one log may be the Auth.log, which is a system authentication log in the LINUX environment. Yet other examples include utmp, wtmp, and btmp logs, which audit user login sessions on Unix-like systems.

In some embodiments, determining the at least one first feature value for the first dataset comprises determining the feature value indicative of the number and/or the type of software applications installed on the first asset. Such a feature may be indicative of whether there are any software applications installed on the first asset with which a user can interact.

In some embodiments, determining the at least one second feature value for the first asset comprises using the data about the first asset and stored in the cloud computing environment to determine: a feature value indicative of user activity with respect to the first asset; a feature value indicative of a degree of activity in at least one cloud-based log associated with the first asset; a feature value indicative of a cloud computing resource type for the first asset; a feature value indicative of network and/or software configuration of first asset; and/or a feature value indicative of a mechanism of deployment of the first asset.

In some embodiments, determining the at least one second feature value for the second dataset comprises determining the feature value indicative of user activity with respect to the first asset. Determining the feature value indicative of user activity with respect to the first asset may comprise determining whether one or more users changed (e.g., via an API call) a security configuration (e.g., permissions, network configuration) of the first asset.

In some embodiments, determining the at least one second feature value for the second dataset comprises determining the feature value indicative of the degree of activity in the at least one cloud-based log associated with the first asset, the at least one cloud-based log being part of the data about the first asset and stored in the cloud computing environment. The feature value indicative of the degree of activity in the at least one cloud-based log may indicate a number and/or type of software packages installed on, modified on, and/or removed from the first asset.

In some embodiments, determining the at least one second feature value for the second dataset comprises determining the feature value indicative of the cloud computing resource type for the first asset. In some embodiments, the first asset is a virtual machine and the feature value indicative of the cloud computing resource type for the first asset indicates whether the virtual machine (VM) launched as a standalone VM resource or as an instance of a group VM resource. The group VM resource may be an autoscaling group resource, an EKS cluster resource, an ECS cluster resource, an EMR cluster resource, a managed instance group, or any resource part of a group of resources that share a common configuration.

In some embodiments, the at least one second feature value for the second dataset comprises determining the feature value indicative of network and/or software configuration of first asset.

In some embodiments, determining the at least one second feature value for the second dataset comprises determining the feature value indicative of the mechanism of deployment of the first asset, wherein the mechanism of deployment of the first asset is manual deployment or automated deployment by cloud-based software.

In some embodiments, the at least one first feature value includes a first plurality of feature values, the at least one second feature value includes a second plurality of feature values, and determining a priority score for the first asset comprises: determining a priority score contribution value for each feature in the first plurality of feature values and for each feature in the second plurality of feature values; and determining the priority score from the determined priority score contribution values.

In some embodiments, the collecting comprises: identifying the at least some of the plurality of assets using the determined scores; and collecting the further data from the at least some of the plurality of determined scores. After collecting further data about at least some of the plurality of assets, the further data may be analyzed to detect presence of one or more security risks.

In some embodiments, in response to detecting a security risk, one or more corrective actions may be recommended to a user and/or one or more corrective actions may be automatically taken to address the security risk.

In some embodiments, the plurality of datasets includes a second dataset for a second asset in the plurality of assets, the second asset being different from the first asset, and determining the priority scores further comprises: determining, using data in the second dataset that was stored by the second asset at one or more timepoints, at least one third feature value for the second asset; determining, using data about the second asset and stored in the cloud computing environment, at least one fourth feature value for the second asset; and determining a priority score for the second asset using the at least one third feature value and the at least one fourth feature value.

Cloud Computing Environment Assets

An "asset" of a cloud computing environment may refer to any addressable physical or virtual device part of the cloud computing environment. An addressable physical device part of the cloud computing environment may be referred to as a "physical asset." An addressable virtual device part of the clouding computing environment may be referred to as a "virtual asset."

Assets part of the cloud computing environment may be interconnected by one or more computer networks and each asset may have one or more addresses on the computer network(s). Each address may be of any suitable type and may be used to enable communication to/from an asset on the computer network(s). Non-limiting examples of addresses include an IP address (e.g., an IPv4 or an IPv6 address), a MAC address, an FTP address, an HTTP address, and a hostname. As can be appreciated from the foregoing, when an asset has multiple addresses, different addresses may be used to enable communication to/from the asset using different communication protocols. Though, some communication protocols may require use of multiple addresses (e.g., IP address and MAC address). Some types of addresses may be assigned by a computer network (e.g., an IP address). Other types of addresses are not assigned by the network and are particular to a device (e.g., a MAC address).

Examples of physical assets in a cloud computing environment include any network-enabled physical device including any network-enabled portable device and any network-enabled fixed device. Non-limiting examples of network-enabled fixed device include a desktop computer, a rack-mounted computer, a server, a network switch, a network router, repeater, or any other network-enabled piece of equipment (e.g., a printer, scanner, a peripheral, etc.). Non-limiting examples of network-enabled portable devices include a smartphone, a smartwatch, a tablet computer, a laptop, a speaker, or any other suitable network-enabled mobile device.

Examples of virtual assets in a cloud computing environment include virtual machines, containers, or any other type of virtual device. A virtual machine may virtualize an entire machine down to the hardware layers. A container may virtualize only software layers above the operating system level.

Assets and Resources

Aspects of the technology described herein relate to prioritizing collection of data from monitored assets in a cloud computing environment. However, it should be appreciated that the technology described herein is not limited to being applied only to cloud computing environment assets.

For example, the techniques described herein may be used to prioritize collection of data from assets in any other computer network environment. As one example, the techniques described herein may be used to prioritize collection of data from assets in a computer network that interconnects hundreds, thousands, millions, tens of millions, or even hundreds of millions of assets addressable on the computer network. For instance, an internal computer network of a large multinational business with tens of thousands of employees may interconnect millions or tens of millions of assets. Thus, the techniques described herein may be used to prioritize collection of data from assets in any suitable computer network environment (e.g., any private, public, or hybrid computer network environment having any suitable number of assets).

As another example, the techniques described herein may be used to prioritize collection of data from cloud computing environment resources other than assets. Examples of cloud computing environment resources include assets, storage resources (e.g., AWS S3 bucket), a queue (e.g., a queue provided by a cloud service), and/or any other type of data structure, in-memory object, software and/or hardware solution from which data may be collected and whose state may be monitored.

Internal and External Features

As described herein, values for internal and external features determined for particular assets may be used to prioritize collection of data from among these particular assets. In some embodiments, feature value calculators may be used to determine feature values for assets, which values are later used in the asset prioritization. A feature value calculator for a particular feature may be software code, which when executed, determines a value for a feature for each of one or more assets. As described herein, calculators for internal features may determine feature values for an asset from (e.g., only) data stored on the asset and calculators for external features may determine feature values for an asset from data about the asset stored in the cloud computing environment (and e.g., without any data stored on the asset itself).

In some embodiments, internal feature values for a particular asset may be determined by analyzing data stored within the particular asset at one or more timepoints. Accordingly, in some embodiments, a dataset containing the data stored by the particular asset at one more timepoints may be obtained (e.g., by collecting data from the asset at the one or more timepoints), and the dataset may be analyzed to determine one or more internal feature values. The dataset for a particular asset may include data (e.g., all the data or some of the data) stored by the particular asset at one point in time or at multiple points in time. When a dataset for a particular asset includes data stored by the particular asset at multiple points in time, this allows comparisons between the sets of data, which facilitates determination of certain features values as described herein.

Non-limiting examples of internal features for a particular asset include: a degree of change in (e.g., security-related) data stored by the particular asset at multiple timepoints, a degree of change (e.g., in security-related data) between a base image and a subsequent image of the particular asset, a degree of activity in asset audit logs, and the number and/or type of software applications installed on the particular asset.

In some embodiments, the degree of change in data stored by the particular asset at multiple time points may be determined by collecting the asset at multiple time points and comparing the collected data. The asset data at different time points may be analyzed and compared to determine a feature value for the degree of change in data stored by the asset. A feature value may be determined for the degree of change in data stored by the asset based on the presence of or number of changes detected between the data (e.g., only the security-related data) stored by the asset at one time point and the data stored by the asset at another time point.

In some embodiments, the degree of change between a base image and a subsequent image of the particular asset may be determined by obtaining images of the asset at multiple time points and comparing the asset images. A base image may be established at the time point where the asset is first collected. A subsequent image may be established at any subsequent time point when the asset is collected and may be a current image of the asset. These images may be analyzed and compared to determine a feature value for the degree of change between the base image and the subsequent image. The feature value may be determined by the presence of and/or number of changes detected between the (e.g., security-related data in the) base image and the (e.g., security-related data in the) subsequent image.

In some embodiments, the degree of activity in asset audit logs may be determined by collecting the asset at a particular time point and analyzing the data stored within audit logs of the asset. A feature value for the degree of activity in asset audit logs may be determined based on the presence of user activity contained within asset audit logs, the type of user activity contained within asset audit logs, the number of user activities contained within asset audit logs, and/or the number of times a user has accessed the particular asset.

In some embodiments, the number and/or type of software applications installed on the particular asset may be determined by collecting the asset at a particular time point and analyzing the collected asset data. The applications contained within the collected asset data may be analyzed and the number of and/or type of applications contained within the asset may be used to determine the feature value. In some embodiments, the presence of security-related applications may be used to determine the feature value. Security-related applications are applications which a user may interact with to interface with the asset to build, manage or maintain software. Examples of specific feature values are provided herein.

In some embodiments, external feature values for a particular asset may be determined by analyzing data about the particular asset, with the data being obtained from the cloud computing environment. In some embodiments, cloud computing environment data for calculating values of one or more external features may be obtained using an API of the cloud computing environment (e.g., the API of GCP, OCI, AWS, IBM Cloud or Azure). In some embodiments, cloud computing environment data may be collected for a particular asset at or near the same time as when data from the particular asset is being collected. In other embodiments, however, data for determining internal and external features may be collected asynchronously.

Non-limiting examples of external features for a particular asset which may be determined cloud computing environment data include: user activity with respect to a particular asset, a degree of activity in at least one cloud-based log associated with a particular asset, a cloud computing resource type for a particular asset, network and/or software configuration of a particular asset, and a mechanism of deployment of a particular asset.

In some embodiments, user activity with respect to a particular asset may be determined by analyzing cloud computing environment data for security-related events. Security-related events contained within cloud computing environment data may be events which could introduce a security risk to an asset or cloud computing environment, such as network configuration changes (e.g., changing of an SSH key, associating an elastic IP address with an instance or network interface), security rule changes (e.g., changing of security groups, for example, by adding an ingress rule to a security group associated with an EC2 instance, etc.), and/or changing data volume associated with an asset. Examples of specific feature values are provided herein.

In some embodiments, a degree of activity in at least one cloud-based log associated with a particular asset may be determined by analyzing asset logs stored in the cloud computing environment. The cloud-based log(s) may contain records of activities such as, for example, users logging into an asset, installation of software applications installed on the asset, modification of software applications installed on the asset (e.g., changes to their configuration, installation of a patch or software upgrade), and removal of software applications from the asset. Examples of specific feature values are provided herein.

In some embodiments, a cloud computing resource type for a particular asset may be determined by analyzing cloud computing environment data for the particular asset. For example, the cloud computing environment data may provide an indication of whether the particular asset is a virtual asset (e.g., a virtual machine) and, if so, how the virtual asset was launched within the cloud computing environment. For example, the cloud computing resource type may indicate whether the particular asset was launched as a standalone VM resource or if the asset was launched as an instance of a group VM resource. An asset which is a standalone VM resource may have an individual configuration, while an asset which is an instance of a group VM resource may have a configuration which is common to all other instances of the group VM resource. As described herein, a group VM resource may be an autoscaling group resource, an EKS cluster resource, an ECS cluster resource, an EMR cluster resource, a managed instance group, or any resource part of a group of resources that share a common configuration.

In some embodiments, network and/or software configuration of a particular asset may be determined by analyzing the cloud computing environment data associated with the particular asset. When a particular asset is deployed to a cloud computing environment, certain configurable parameters of the asset are set to particular values, including, for example, network configurations and software configurations. These configurations are stored in cloud computing environment data and may be analyzed to determine a corresponding feature value. In some embodiments, cloud computing environment data may be analyzed for security-related configurations, which are used to determine the corresponding feature value.

In some embodiments, a mechanism of deployment of a particular asset may be determined by analyzing cloud computing environment data associated with the particular asset. When an asset is deployed to a cloud computing environment, data detailing if the asset was deployed manually or through automation are stored in cloud computing environment data. A corresponding feature value may be determined based on if the deployment of an asset was manual or automated.

Identifying Security Risks and Corrective Actions

In some embodiments, security risks may be identified in data collected from cloud computing assets. Examples of security risks include various vulnerabilities including, but not limited to, known software bugs, out-of-date software applications versions, unpatched software applications, corrupted data, unencrypted data, improper access permissions for assets, misconfigurations (e.g., settings that are incorrect or inconsistent with security policies such as network settings, software application settings, operating system settings, etc.), computer viruses, malware (e.g., adware, ransomware, spyware, trojans, bots, etc.), and/or any other security risks.

In some embodiments, corrective actions may be taken to address identified security risks within a given asset or cloud computing environment. Corrective actions may be performed automatically (e.g., by an information security system) or manually (e.g., by one or more system administrators). Non-limiting examples of corrective actions include updating software (e.g., by installing a newer version of the software, applying a patch), changing the network configuration of an asset, changing the configuration of one or more software applications executing on the asset, changing the configuration of an operating system executing on the asset, changing one or more permissions for the asset, deleting malware, removing corrupted files or data, taking a physical offline, killing an instance of a virtual asset, and blocking communications to and/or from the asset.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

FIG. 1 shows an illustrative environment 100 in which an information security system may operate, in accordance with some embodiments of the technology described herein. The environment 100 includes cloud computing environment 110 and information security system 120.

The information security system 120 may be configured to provide information security services with respect to the cloud computing environment 110. For example, the information security system 120 may monitor assets in the cloud computing environment 110, communications among the assets, communications directed to the assets originating from senders part of or external to the cloud computing environment, and/or communications from the assets to one or more recipients part of or external to the cloud computing environment.

In some embodiments, the information security system 120 may monitor the cloud computing environment for different types of security risks. Examples of security risks are provided herein. Additionally, or alternatively, the information security system 120 may monitor network traffic and may operate one or more firewalls, intrusion detection systems, and/or any other suitable cybersecurity applications.

The information security system 120 not only may detect one or more types of security risks, but also may be configured to perform one or more actions to address any detected security risks. As one example, the information security system may notify one or more users (e.g., one or more administrators 130) about a security risk in response to detecting the security risk. Additionally, in some embodiments, the information security system 120 may be configured to recommend one or more actions that a user (e.g., administrator 130) may take to address the security risk. One or more administrators 130 may interact with the information security system 120 to address any detected security risks. Additionally or alternatively, the information security system may be configured to automatically address a security risk in response to detecting the security risk (e.g., by taking a potentially compromised asset offline, blocking one or multiple communications, reconfiguring an asset, for example its network configuration, installing an update to the software executing on the asset, deleting malware, removing corrupted files or data, etc.).

The information security system 120 may be implemented internal to the cloud computing environment, external to the cloud computing environment, or as a hybrid system, as shown in FIG. 1, where one or more software modules (e.g., cloud-based modules 120A) are implemented within the cloud computing environment (e.g., as software on the physical infrastructure of the cloud computing environment) and one or more software modules (e.g., external modules 120B) external to the cloud computing environment. For example, the module(s) 120A may implement functionality relating to monitoring assets, collecting data from assets, and implementing specific actions to address detected security risks. As another example, the module(s) 120B may implement functionality for determining a prioritization with respect to which data is to be collected from assets being monitored, analyzing the data collected from assets, identifying any security risks to the cloud computing environment from the collected data, identifying one or more actions to take to address the security risks, and/or enabling administrator(s) to interact with the information security system 120.

As shown in FIG. 1, the cloud computing environment 110 includes physical assets 111, virtual assets 112, and virtual asset manager 113. Examples of physical and virtual assets are provided herein. Virtual asset manager 113 may comprise software for managing virtual assets 112 (e.g., by launching, monitoring, allocating cloud resources to, shutting down VM instances). Though these are shown separately within FIG. 1, this is done for clarity of presentation, as virtual assets 112 and virtual asset manager 113 are software assets that execute on or more physical assets 111.

The cloud computing environment 110 may include any suitable number of assets of any suitable type. For example, physical assets 111 may include tens, hundreds, thousands, tens of thousands, hundreds of thousands, or millions, of addressable physical assets. As another example, virtual assets 112 may include tens, hundreds, thousands, tens of thousands, hundreds of thousands, millions, tens of millions, or hundreds of millions of virtual assets. As cloud computing services continue to evolve and develop, a cloud computing environment may include an even greater number of assets, and aspects of the technology described herein are not limited in this respect.

As described above, conventional "pull" monitoring techniques collect complete snapshots of data from monitored assets at set time intervals. These snapshots are subsequently analyzed to identify any security risks. This scheme is illustrated in FIG. 2, which shows an illustrative example of an information security system 120 collecting information about assets in a cloud computing environment at multiple time points.

Figure 2:
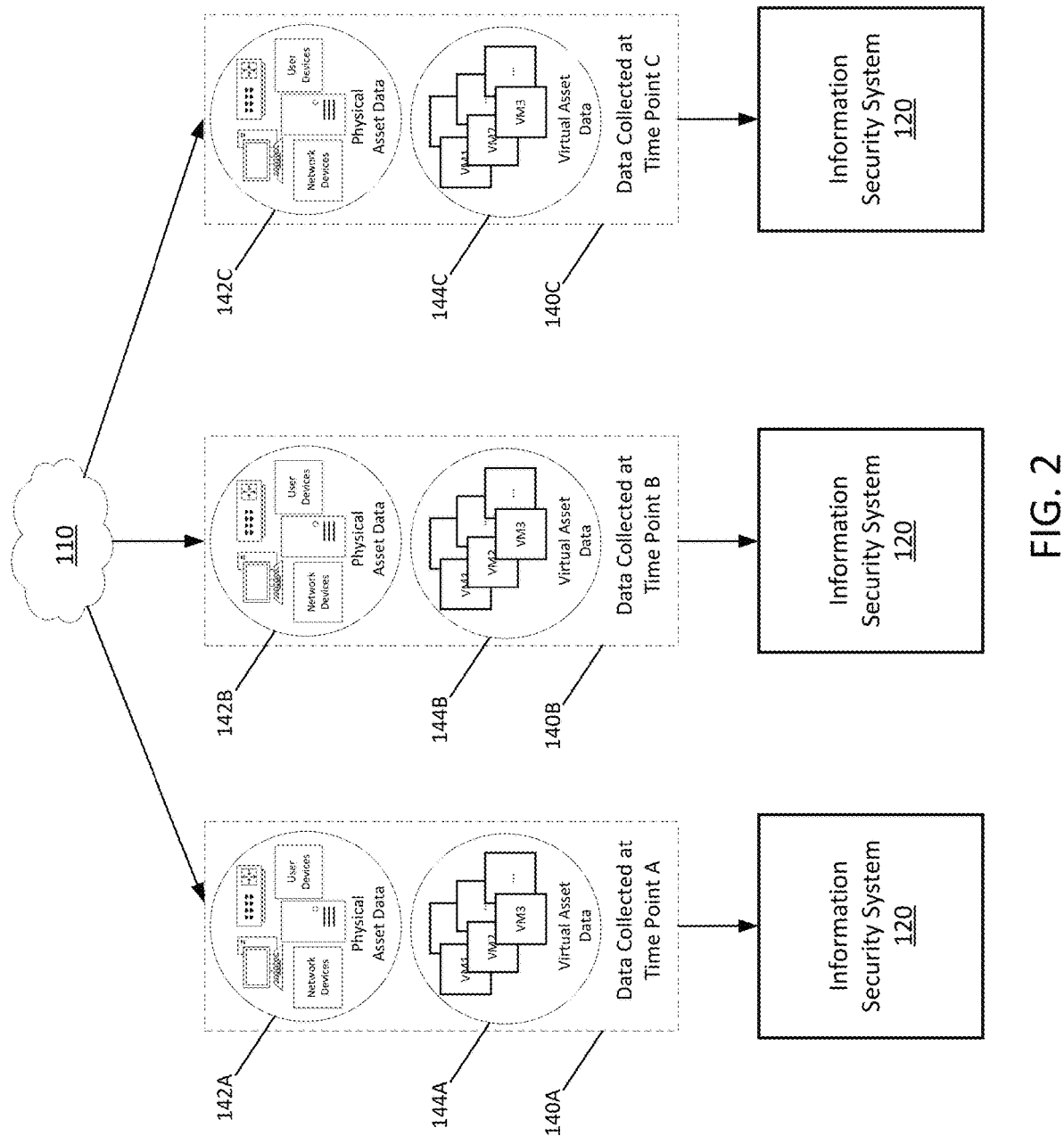
FIG. 2 shows an illustrative example of an information security system collecting information about assets in a cloud computing environment at three different time points.

In particular, as shown in FIG. 2, data from all the monitored assets is being collected at the three time points A, B, and C. The collected data is provided to information security system 120. The collected data is subsequently analyzed by the information security system 120 to detect security risks, if any.

Three data collections 140A, 140B and 140C are shown in FIG. 2, each corresponding to a respective time point A, B and C. Time point A comes before time point B, which comes before time point C. Each data collection 140A, 140B and 140C of FIG. 2 includes data collected from every asset in the cloud computing environment 110—this includes data from all physical assets and all virtual assets part in the cloud computing environment 110. For example, the collected data 140A includes data 142A collected from physical assets in the cloud computing environment 110 and data 144A collected from virtual assets in the cloud computing environment 110. The collected data 140B includes data 142B collected from physical assets in the cloud computing environment 110 and data 144B collected from virtual assets in the cloud computing environment 110. The collected data 140C includes data 142C collected from physical assets in the cloud computing environment 110 and data 144C collected from virtual assets in the cloud computing environment 110.

Complete collection of data stored by all assets in a cloud computing environment is impractical and requires gigabytes to terabytes of data to be collected at each such collection because the cloud computing environment 110 contains many assets.

In the example of FIG. 2, collecting all assets at set time intervals generates massive waste due to the amount of data collected at each time point. Although some of the assets contained within cloud computing environment 110 may not have changed in configuration since the previous collection, they are still collected at the next interval. Collecting data from such assets extends the amount of time necessary to analyze the data collected and, consequently, delay the time before a subsequent collection can be performed. Such a delay may leave detectable vulnerabilities exposed within computing environment 110 or may allow threats to propagate for an extended period before detection. The waste generated by this conventional method of asset collection additionally strains the computer and network bandwidth resource required to perform such collections at set intervals. The inventors have recognized the drawbacks of conventional information security monitoring techniques and have consequently developed techniques for reducing these inefficiencies.

Figure 3:
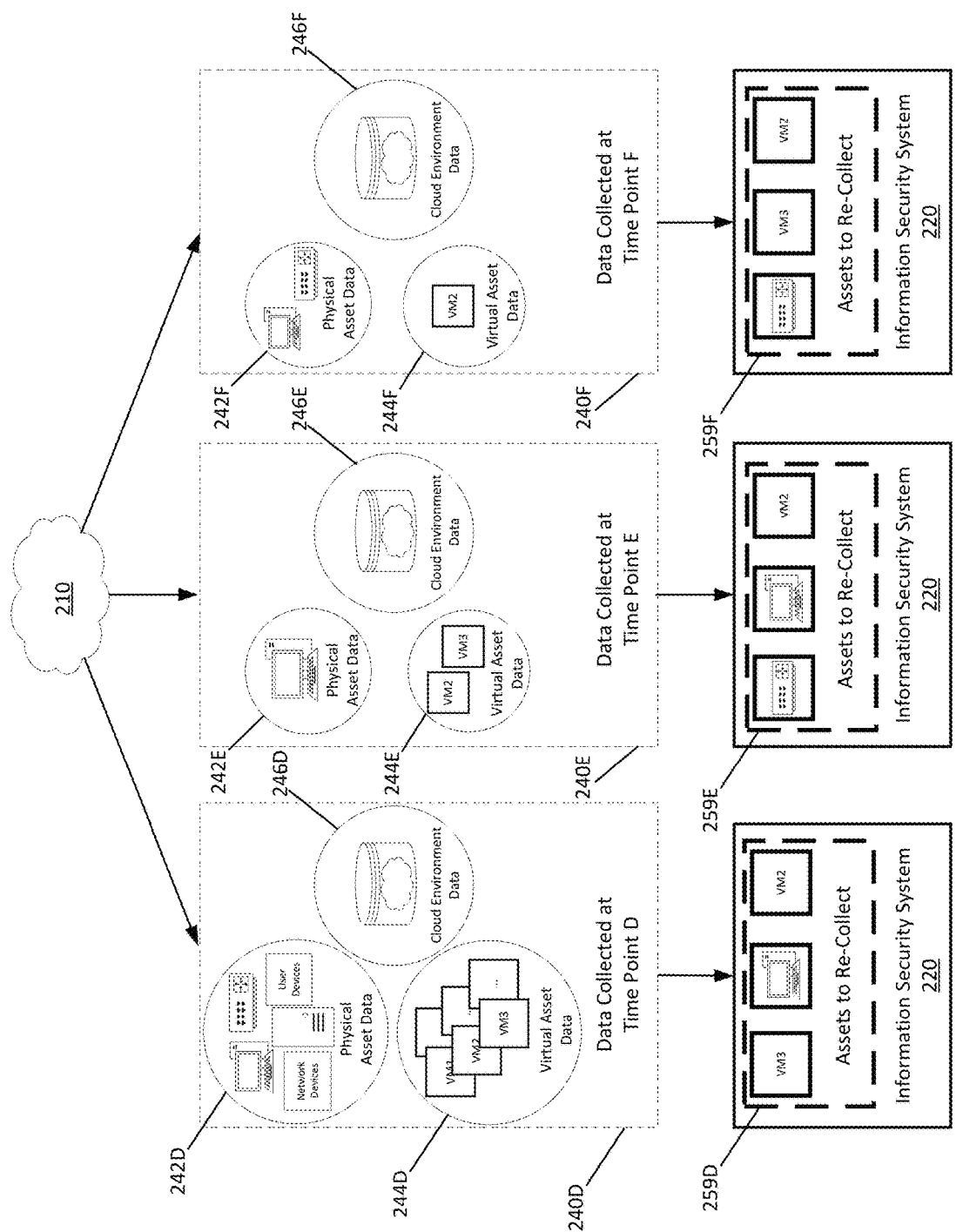
FIG. 3 shows an illustrative example of a security system collecting assets from a cloud computing environment at three different time points, in accordance with some embodiments of the technology described herein.

FIG. 3 shows an illustrative example of an information security system collecting assets from a cloud computing environment at three different time points, in accordance with some embodiments of the technology described herein. Time point D comes before time point E, and time point E comes before time point F. The amount of time between timepoints D and E and E and F is any suitable amount of time and may not be the same amount of time. Each collection 240D, 240E and 240F contains respective physical asset datasets 242D, 242E and 242F, respective virtual asset datasets 244D, 244E and 244F, and respective cloud computing environment data 246D. 246E and 246F.

Collection 240D is a full collection of all assets contained within cloud computing environment 210. Cloud computing environment 210 may contain physical and virtual assets as described herein. Full collection 240D, may also be referred to as an initial collection. Initial collection 240D may be used by information security system 220 to analyze all collected asset datasets 242 and 244 and cloud computing environment data 246, and to determine initial values for features associated with each of the assets. The values of these features may be based on the presence of security-related vulnerabilities in assets of cloud computing environment 210 and may be used in conjunction with cloud computing environment data 246 to prioritize assets for a subsequent collection. Feature values may change over time to determine future recollections of assets.

Based on the prioritization of these assets, information security system 220 may determine a subset 259 of the assets which should be recollected for further analysis. This subset of assets 259 contains assets which are determined to be particularly vulnerable for security risks. Therefore, these assets should be recollected and analyzed for security risks which can be addressed by information security system 220.

In the example of FIG. 3, security system 220 selects three assets for recollection in a partial collection, however this number of assets is exemplary, and any number of assets may be selected for recollection. For example, security system 220 may select the same number of assets at every recollection or may only recollect assets which are prioritized above a threshold priority score. Selecting a subset of assets for recollection reduces the amount of data which is processed at each collection. Consequently, the system described herein may perform collections at a faster rate than conventional systems and may reduce the waste associated with each collection. Waste may be reduced because assets which are not determined by information security system 220 as likely to contain security-related vulnerabilities are not collected in recollections, for example in collections 240E and 240F. In addition, by only collecting the assets which are prioritized for collection, security system 220 may respond to threats to cloud computing environment 210 faster than a conventional system would.

At time point D, the security system determines the assets to be recollected 259D as two virtual assets, VM2 and VM3, and one physical asset, a desktop computer. At time point E, data corresponding to these assets 259D are collected as a partial collection, as is cloud computing environment data 246E. Assets, for example virtual asset VM1, were not collected at time point E because after analysis at time point A, these assets were determined not to present as many security vulnerabilities as the assets contained within 259D. However, at time point E, collected cloud computing environment data 246E may provide information indicating actions have been taken on a particular non-collected asset which may raise its priority for recollection.

At time point E, collected data 240E is analyzed to determine the assets to be recollected 259E. Two physical assets, the desktop computer and a network device, and one virtual asset, VM2, are contained within 259E. Information contained within cloud computing environment data 246E may have indicated the network device contained within 259E may have undergone security-related changes, and therefore its priority for recollection is raised. Additionally, after analyzing the data contained within virtual asset VM3 collected at time point E, security system 220 may lower its priority for collection as no security-related changes may have been identified.

At time point F, assets 259E are collected in partial collection 240F as physical asset datasets 242F and virtual asset datasets 244F, along with cloud computing environment data 246F. This data is then analyzed to determine assets to recollect 259F. This asset analysis and recollection process may continue over time, or in some embodiments, may have intermittent full collections. These intermittent full collections may occur at set time periods, may occur after a set number of recollections have occurred, or may use another metric to determine when to perform a full collection.

Cloud computing environment data 246 is data obtained from cloud computing environment 210. Cloud computing environment data contains data about the activity within cloud computing environment 210 and contains data about assets contained within cloud computing environment 210 and activity performed on these assets. Cloud computing environment data 246 contains data about assets, however, information security system 220 does not require corresponding assets to be collected to analyze cloud computing environment data 246. Data about assets contained within cloud computing environment data 246 may include but is not limited to user-based asset activity, asset configuration, cloud-based asset log activity, cloud computing resource type, and asset deployment mechanism. Because cloud computing environment data 246 does not require collection of corresponding assets, less data is contained within each subsequent collection, for example 240E and 240F, after an initial collection 240D, than are in collections performed by a convention system, for example collections 140B and 140C.

Analysis of cloud computing environment data 246, by security system 220, may give indications if assets have been accessed in a way which may have introduced vulnerabilities into cloud computing environment 210 or if suspicious activity is occurring on any assets contained within cloud computing environment 210. This data may give an indication of the risk associated with a particular asset, without requiring the collection and analysis of the data contained within that asset. Cloud computing environment data 246 may be received by the information security system 220 in a variety of ways, as described herein. The collection of this cloud computing environment data allows security vulnerabilities of all assets to be determined without necessitating the collection of all assets.

Figure 4A:
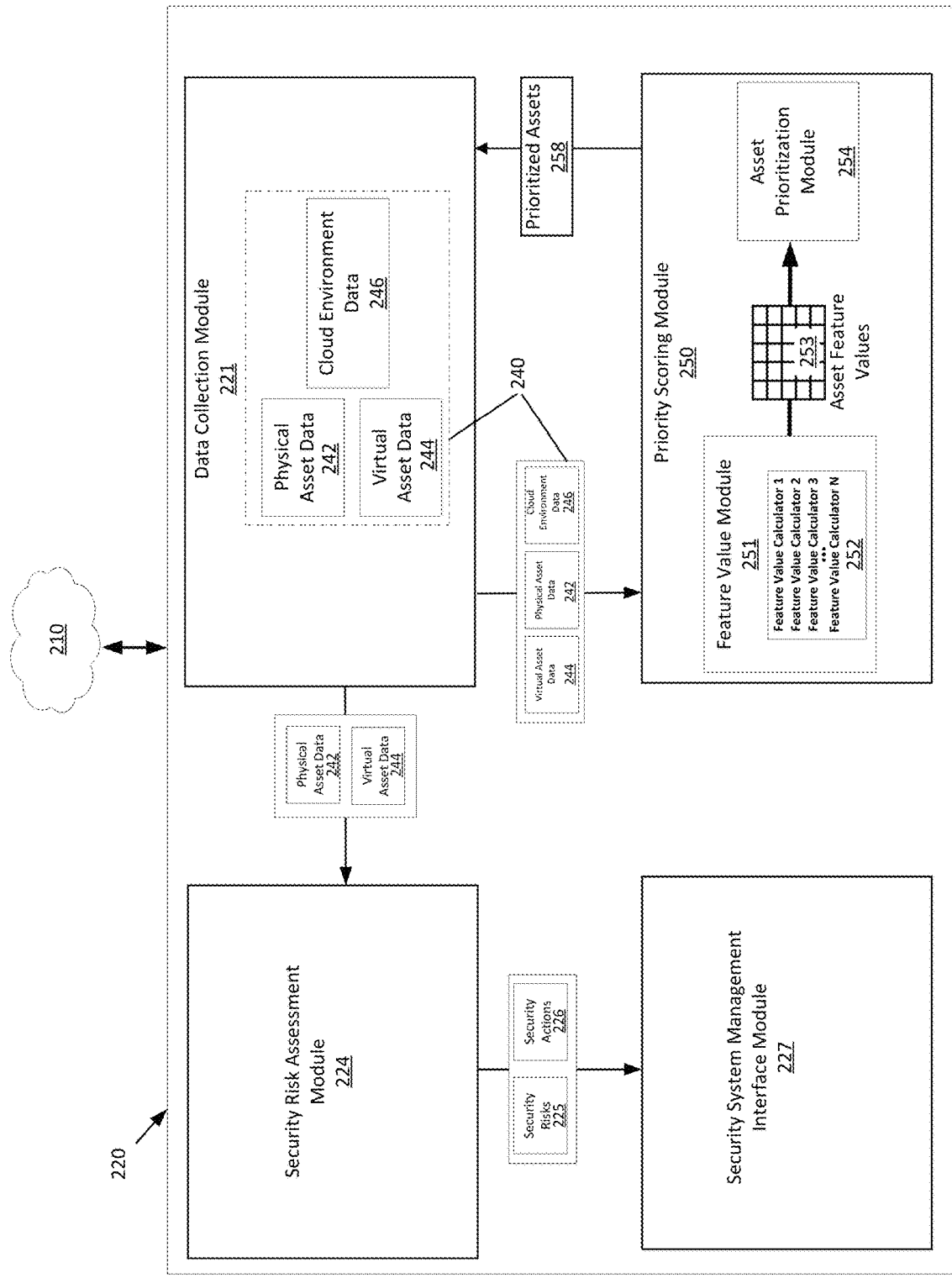
FIG. 4A is a block diagram of components of an example information security system, in accordance with some embodiments of the technology described herein.

Data collected by the information security system 220 may be used to inform the contents of subsequent collection and to identify and address security risks present in cloud computing environment 210. FIG. 4A is a block diagram of components of an example information security system, in accordance with some embodiments of the technology described herein. Shown in FIG. 4A, information security system 220 is in communication with cloud computing environment 210. Information security system 220 contains multiple modules, which perform various functions. Shown here are Data Collection Module 221, Security Risk Assessment Module 224, Security System Management Interface Module 227, and Priority Scoring Module 250. Information security system 220 may contain more modules than those shown in FIG. 4A or fewer modules than those shown in FIG. 4A. The modules of security information system 220 may be in communication with each other and may send different data between modules for analysis.

The information security system 220 may be implemented internal to the cloud computing environment, external to the cloud computing environment, or as a hybrid system, where one or more software modules are implemented within the cloud computing environment (e.g., as software on the physical infrastructure of the cloud computing environment) and one or more software modules external to the cloud computing environment. For example, the cloud-based module(s) may implement functionality relating to monitoring assets, collecting data from assets, and implementing specific actions to address detected security risks. As another example, the external module(s) may implement functionality for determining a prioritization with respect to which data is to be collected from assets being monitored, analyzing the data collected from assets, identifying any security risks to the cloud computing environment from the collected data, identifying one or more actions to take to address the security risks, and/or enabling administrator(s) to interact with the information security system 220.

Data collection module 221 is provided in information security system 220. Data collection module is in communication with cloud computing environment 210 and may request and receive data 240 from cloud computing environment 210. Data collection module 221 may communicate with cloud computing environment 210 to request certain assets for collection. In the event of a full collection, for example collection 240D, all assets are requested from cloud computing environment 210. In the event of a subsequent partial collection, for example collection 240E, only the assets prioritized for recollection 259D are requested from cloud computing environment 210.

Data collection module 221 may additionally distribute collected data to other modules within information security system 220. Collected data 240 may be distributed to priority scoring module 250. Priority scoring module 250 may analyze the collected data 240 and return a prioritization of assets 258, from which data collection module 221 may request assets to recollect 259. Data collection module 221 may also distribute physical asset datasets 242 and virtual asset datasets 244 to security risk assessment module 224, where asset datasets may be analyzed for security threats and vulnerabilities.

Security risk assessment module 224 is provided within information security system 220. Security risk assessment module 224 may perform various analyses on physical asset datasets 242 and virtual asset datasets 244 in order to determine the presence of information security risks, including information security threats and information security vulnerabilities, present within assets of cloud computing environment 210. Examples of security risks, threats and vulnerabilities are provided herein. Identified security vulnerabilities and threats may be sent to security system management interface module 227 as security risks 225. Efficient identification of vulnerabilities and threats can ensure the cloud computing environment is protected against information security threats.

Security risk assessment module 224 may additionally recommend security actions 226 based on detected security risks 225. Security actions 226 may include corrective actions to address any identified security risks 225. Examples of security actions 226 are provided herein. Security risk assessment module 224 may additionally be capable of automatically addressing identified security risks by automatically implementing recommended security actions 226.

Security system assessment module 224 may send identified security risks 225 and recommended security actions 226 to security system management interface module 227. Security system management interface module may allow administrator(s) (not pictured) to view identified security risks 225 and recommended security actions 226. Security system management interface module 227 may allow administrators to interact with information security system 220, deploy security actions 226 or deploy other actions to address security concerns within cloud computing environment 210.

Information security system 220 is additionally provided with priority scoring module 250. Priority scoring module 250 may receive data 240 collected from cloud computing environment 210 from data collection module 221 and send prioritized assets 258 to data collection module 221. Priority scoring module 250 contains feature value module 251 and asset prioritization module 254. Priority scoring module 250 provides asset feature values 253 to the asset prioritization module 254. The asset prioritization module may then calculate asset prioritization scores from the asset feature values and send the asset prioritization scores to data collection module as prioritized assets 258.

Feature value module 251 may contain multiple feature value calculators 252, each of which may analyze data collected from the cloud computing environment 210 and determine a feature value for assets contained within cloud computing environment 210. Feature value calculators 252 may include internal feature value calculators which determine values for internal features as described herein. These internal feature value calculators will analyze data collected from assets contained within cloud computing environment 210, such as virtual asset datasets 244 and physical asset datasets 242. Internal feature value calculators will not analyze cloud computing environment data 246. Cloud computing environment data 246 may be analyzed by external feature value calculators, which may determine values for external features as described herein.

FIG. 4B is a table which contains asset feature values determined by corresponding feature value calculators, in accordance with some embodiments of the technology described herein. FIG. 4B contains values for internal features 255, and values for external features 256. Feature values are determined for a collection of assets, for example collection 240 of FIG. 3. The feature values shown in FIG. 4B are example feature values for full collection 240D.

Internal feature values contained within FIG. 4B include Asset Data Changes 253A, Asset Audit Log Activity 253B, Differences Between Base Asset Image and Current Image 253C, and Asset Applications 253D. External feature values contained within FIG. 4B include User Based Asset Activity 253E, Asset Configuration 253F, Cloud-Based Log Activity 253G, Cloud Computing Resource Type 253H and Asset Deployment Mechanism 253I. In FIG. 4B, feature values are given for six assets. The feature values of an asset are given in the same row as the asset name in the leftmost column of the table.

Feature values depicted in FIG. 4B are exemplary feature values. Different feature values may be used according to different embodiments. In FIG. 4B, a feature value of 0 indicates a particular asset is not likely to contain security-related vulnerabilities associated with a particular feature. A feature value of 1 indicates a particular asset contains or is more likely to contain security-related vulnerabilities associated with a particular feature.

In some embodiments, additional feature values may be used. For example, for feature value 253B, a feature value of 1 indicates a particular asset contains or is more likely to contain security-related vulnerabilities at a first level, and a feature value of 2 indicates a particular asset contains or is more likely to contain security-related vulnerabilities at a second level. For feature value 253B, the second level is higher than the first level and indicates an asset may contain more security-related vulnerabilities or may contain more severe security-related vulnerabilities. Feature values of FIG. 4B may each be calculated by a corresponding feature value calculator.

Figure 5:
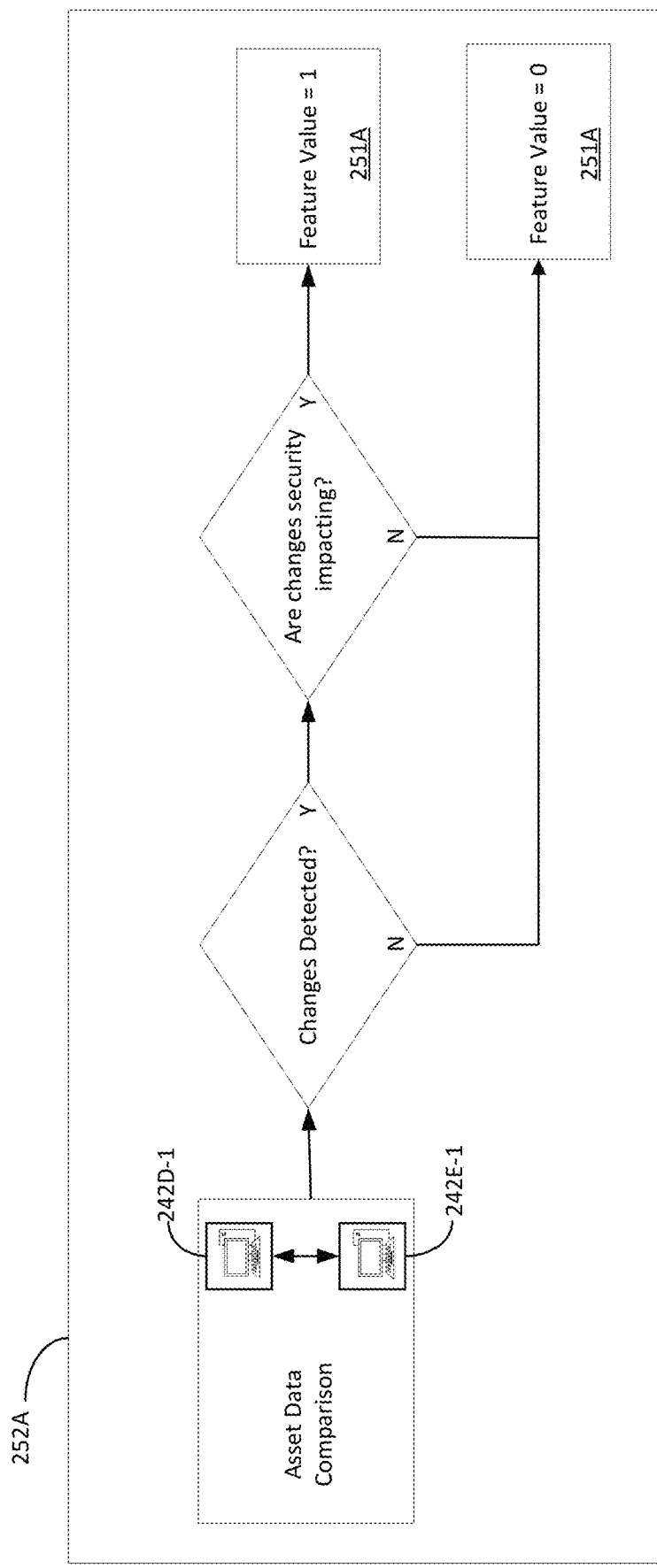
FIG. 5 is a flow chart of a process carried out by an example feature value calculator, to determine a feature value of an asset from the cloud computing environment, in accordance with some embodiments of the technology described herein.

FIG. 5 is a flow chart of a process carried out by an example feature value calculator, to determine a feature value 253A of an asset in the cloud computing environment, in accordance with some embodiments of the technology described herein. FIG. 5 depicts the process performed by feature value calculator 252A for calculating the feature value for the degree of change in an asset between collection 253A. Determining the degree of change in data may require an asset to be collected multiple times, to compare the asset data at two different time points. Alternatively, collected asset datasets 242, 244 may contain data associated with a current time point and past time point(s), and multiple collections may not be necessary to determine the degree of change in data. If a particular asset undergoes data changes between collections, this is an indication the asset may be more likely to change in the future and should be prioritized for future collections. If a particular asset does not change between collections, it may be unlikely introduce security-related vulnerabilities and therefore its priority for recollection should be lowered.

In this example, data of a physical asset represented by a desktop computer collected at time point D 242D-1 and at time point E 242E-1 is compared. The first action performed by feature value calculator 252A is to determine if changes are present in data 242E-1 when compared to data 242D-1. Asset data changes may include but are not limited to: new applications within the asset, new files within the asset, changes to existing files within the asset, changes to kernel logs, changes to application logs, and changes to system data among other changes.

If changes are not identified by feature value calculator 252A, then the feature value may be set to 0. If changes are identified, the changes may be analyzed to determine if the changes are security-related changes or non-security-related changes. This determination of security-related changes or non-security-related changes may prevent the collection priority of an asset being raised due to changes associated with normal operation of the asset, therefore reducing waste during collections.

Feature value calculator 252A may maintain a list of known set of security-related changes or non-security-related changes or may determine whether a change is security-related based on certain aspects of the change. Examples of security-related changes may include: additional applications installed on the asset, user logs which indicate user activity on the system, configuration audit logs of the system, and additional container status files which indicate new running containers. Some embodiments may include more security-related changes or fewer security-related changes, and the technology is not limited in this regard. Examples of non-security-related changes may include: kernel logs related to normal system operation, application logs, additional data stored on the system such as database files, added MySQL files, added PostgreSQL files, added SQLite files, health check logs and status logs. Some embodiments may include more non-security-related changes or fewer non-security-related changes, and the technology is not limited in this regard. If changes detected in the asset are determined to be security-related changes, the asset feature value may be set to 1, indicating this asset may be likely to undergo changes in the future and should have its priority raised for recollection. If changes detected in the asset are determined to be non-security impacting changes, the asset feature value may be set to 0. After determining the feature value for one asset, the feature value calculator 252A may then analyze the remaining collected assets until all possible asset feature values have been calculated.

In addition to feature value calculator 252A, feature value module 251 of FIG. 4A may be provided with additional feature value calculators to determine values for other internal and external features. Examples of these additional feature value calculators are described below.

An additional internal feature value calculator may calculate feature value 253B based on internal audit log activity. Audit logs may contain security-related and non-security-related activities as discussed herein. If an asset contains security-related activities its priority score may be raised and if an asset only contains non-security related activities its priority score may not be raised. For example, if a particular asset contains only non-security-related audit log activity, its feature value 253B may be set to 0. If a particular asset contains security-related audit log activity its feature value 253B may be set to 1.

According to some embodiments, specific security-related audit log activities may cause to asset feature value 253B to be raised to a first level, for example 1, and other specific security-related audit log activities may cause the asset feature value 253B to be raised to a second level, higher than the first level, for example 2. An example of a security impacting audit log activity which may raise feature value 253B to the first level may be users connecting to an asset, while an example of a security impacting audit log activity which may raise feature value 253B to the second level may include users logging into an asset and running certain documented commands.

This feature value calculator may calculate an internal audit log feature value 253B for all assets which have been collected at a certain time point.

An additional internal feature value calculator may determine a feature value 253C based on differences between the base image of an asset and subsequent images of the asset. During an initial collection, for example collection 240D of FIG. 3, a base image of all assets may be established. The base image contains information related to filesystem of an asset. To determine feature value 253C, a comparison may be made to determine the degree of change between the base image of an asset and the current image of the asset, determined from a subsequent collection. For example, if the current image of an asset is found to be configured or stored in a different way from the base image, the feature value may be set to 1. If the current image does not vary from the base image, the feature value may be set to 0.

In some embodiments, to determine feature value 253C, security-related data of the base image may be compared to security-related data of the current image, and feature value 253C may be determined based on the degree of change of the security related data. Security-related data of an asset image may include data which impacts security permissions of an asset, access to the asset, or sensitive data stored within the asset, among other data as discussed herein.

After determining the feature value 253C for a first asset, the respective feature value calculator may then analyze the remaining collected assets until all possible asset feature values 253C have been calculated.

A final example of an internal feature value calculator may calculate a feature value 253D for an asset based on the applications contained within the asset. This feature value calculator may analyze an asset to determine the applications contained within the asset. The applications contained within the asset may be categorized into a group of security-related applications and non-security-related applications. Security-related applications may be applications which allow users to interface with the asset to build, manage or maintain software, among other applications as discussed herein. Examples of security impacting applications may include, but are not limited to: web browsers, productivity software, document authoring software, file management software, photograph editing software, design software, video viewing software, communication software, IDE tooling, and software used to build applications, among other applications. Specific examples of security-related software include but are not limited to: Chrome, Safari, Firefox, Brave, Microsoft Office Suite, Dropbox, Photoshop, Gimp, AutoCAD, Autodesk Suite, VLC, Slack, Skype, Microsoft Teams, FlowDock, Eclipse, Notepad++, Sublime Text, VSCode, Intellij, Pip, Maven, Gradle and Go. Non-security-related applications may be applications installed on an asset and are required to run other software, such as Python, Java, Bash and Curl. If an asset is determined by the feature value calculator to have security-related applications deployed, the asset feature value 253D may be set to 1. If an asset is determined by the feature value calculator not to have security-related applications deployed, the asset feature value 253D may be set to 0. This feature value calculator may calculate feature value 253D for all assets which have been collected at a certain time point.

Feature value module 251 may additionally include external feature value calculators, which determine feature values for assets based on cloud computing environment data, for example cloud computing environment data 246. One example of an external feature value calculator may determine a feature value 253E based on the degree of user activity associated with an asset. This feature value calculator may review cloud computing environment data for specific security-related events. Security-related events may include network configuration changes, security rule changes, or changing data volume associated with an asset, among other events. Specific examples of security-related events which may be associated with a particular asset include AssociateAddress, AuthorizeSecurityGroupIngress, and Attach Volume. Security-related events may occur through Application Programming Interface (API) calls to the cloud computing resource. If a security-related event is identified, the feature value 253E for the associated asset may be set to 1. If no security-related events are identified with respect to an asset, the feature value 253E for the asset may be set to 0. All collected cloud computing environment data 246 corresponding to a particular time point may be reviewed to determine feature value 253E for all assets.

An additional external feature value calculator may calculate feature value 253F for assets based on the configuration of the asset. When an asset is deployed within a cloud computing environment, for example cloud computing environment 210, certain metadata of the asset may be configured to different settings, for example network configurations and software configurations. Specific metadata configurations may be considered security-related configurations, which can introduce information security vulnerabilities or risks into cloud computing environment 210. Examples of security-related configurations may include but are not limited to: Secure Shell (SSH) Keys; security groups which allow remote, SSH, or Remote Desktop (RDP) access to an asset; and user data configuration. Asset configurations contained within cloud computing environment data 246 are analyzed and if security-related configurations are identified for a particular asset, the asset feature value 253F may be set to 1. If no security-related configurations are identified for an asset, the asset feature value 253F may be set to 0. All collected cloud computing environment data 246 corresponding to a particular time point may be reviewed to determine feature value 253F for all assets.

An additional external feature value 253G may be determined by feature value module 251 based on a degree of user activity in cloud-based logs associated with a corresponding asset. Cloud computing environment data 246 contains cloud-based logs which may detail user activities taken on assets. A corresponding feature value calculator may determine if the user activities in cloud-based logs associated with a particular asset are security-related. If user activities are determined to be security-related, the feature value 253G for the corresponding asset may be set to 1. If user activities are determined to be non-security-related, or if no user activities related to a particular asset are in cloud computing environment data, the feature value 253G for the corresponding asset may be set to 0.

An additional external feature value 253H is determined by feature value module 251, which may be based on the identity of an asset. In a cloud computing environment, for example 210, some assets are more likely to introduce security-related vulnerabilities during use than other assets. Assets which have security-related vulnerabilities may be prioritized for subsequent collections. The cloud computing resource type of assets may be used to determine feature value 253H, specifically for virtual machines (VMs). The computing resource types of VMs may be analyzed to determine feature value 253H. VMs which are launched as a standalone VM resource and/or with an individual configuration, may have their corresponding feature value 253H may be set to 1, because these VMs may be more likely to have security-related vulnerabilities. VMs which are launched as an instance of a group VM resource may be less likely to have security-related vulnerabilities because such VMs are configured and launched together with a common configuration. Accordingly, feature value 253H for assets associated with a group VM resource may be set to 0. Specific examples of group VM resources may include but are not limited to: auto-scaling groups, EKS Clusters, ECS Clusters or EMR Clusters.

In some embodiments, assets apart from VMs may also be analyzed to determine a feature value 253H associated with asset identity. If an asset is determined to have security-related vulnerabilities based on its identity, feature value 253H may be set to 1, if an asset is determined not to have security-related vulnerabilities based on its identity, feature value 253H may be set to 0.

All cloud computing environment data 246 associated with a particular time point may be analyzed to determine feature value 253H for all assets.

Feature value module 251 may calculate an additional feature value 253I based on the mechanism of deployment for assets. In a cloud computing environment for example environment 210, assets deployed manually or by a user to the environment may be more likely to contain security-related vulnerabilities than assets which have undergone automated deployments by cloud-based software. If an asset is determined to have been deployed manually the asset feature value may be set to 1. If an asset is determined to have been deployed by an automated mechanism, the feature value for the corresponding asset may be set to 0.

FIG. 6 shows a table which contains asset priority scores and asset priority score component values which may be calculated by an example information security system after an initial asset collection, in accordance with some embodiments of the technology described herein. The values shown in FIG. 6 may be calculated by Asset Prioritization Module 254 of FIG. 4A, based on feature values 253 received from feature value module 251. The table of FIG. 6 contains asset names in the leftmost column and asset priority scores 258 in the rightmost column. Each asset's corresponding priority score component values 257 and priority score 258 are in the same row as the asset name in the leftmost column. The columns between the leftmost and rightmost contain the name of the corresponding feature value 253 in the topmost row, and priority score component values for respective assets in the following rows. Assets are ordered from top to bottom by priority scores 258, with the largest priority score on the topmost asset row.

To determine the values shown in FIG. 6, first, feature values 253 may be delivered to asset prioritization module 254 from feature value module 251. Based on the feature values for each asset, corresponding priority score component values 257 are determined. Priority score component values 257 may be positive integers, negative integers, zero or any other suitable number including any real number. In FIG. 6, priority score component values are then summed to determine the priority scores 258 for all assets.

An asset's priority score 258 is an indication of how likely the asset is to contain security-related vulnerabilities and thus what priority an asset should be given for recollection and further analysis. In this example, a higher priority score 258 indicates an asset is more likely to contain security-related vulnerabilities and the asset should be prioritized for recollection, however different scoring mechanisms may be used. Different mathematical operations may be used to determine the priority scores 258 for assets, including but not limited to multiplying priority score component values 257, dividing priority score component values 257, and raising priority score component values 257 to exponents. These mathematical operations may be used in any combination, alone, or in addition to a summing operation to determine priority scores 258.

Priority score component values 257 may be determined by applying different weights to the received feature values. In FIG. 6, priority score component values 257 correspond to the feature values 253 of FIG. 4B. The weights used to determine priority score component values 257 may depend on the feature value associated with the respective component value. For example, a priority score component value 257 of −1 is given to a feature value 253A of 0 associated with asset data changes. According to the example of FIG. 6, a priority score component value 257 of 3 is applied to assets with feature values 253A of 1 for asset data changes.

According to the example of FIG. 6, a priority score component value 257 equal to the feature value 253B associated with asset audit log activities is applied to assets.

According to the example of FIG. 6, a priority score component value 257 of −5 is given to assets with a feature value 253C of 0 and a priority score component value 257 of 1 is given to assets with a feature value 253C of 1.

According to the example of FIG. 6, a priority score component value 257 of 3 is given to assets with a feature value 253D of 1 and a priority score component value 257 of 0 is given to assets with a feature value 253D of 0.

According to the example of FIG. 6, a priority score component value 257 of 2 is given to assets with a feature value 253E of 1 and a priority score component value 257 of 0 is given to assets with a feature value 253E of 0.

According to the example of FIG. 6, a priority score component value 257 of 2 is given to assets with a feature value 253F of 1 and a priority score component value 257 of 0 is given to assets with a feature value 253F of 0.

According to the example of FIG. 6, a priority score component value 257 of 1 is given to assets with a feature value 253G of 1 and a priority score component value 257 of 0 is given to assets with a feature value 253G of 0.

According to the example of FIG. 6, a priority score component value 257 of 0 is given to assets with a feature value 253H of 1 and a priority score component value 257 of −3 is given to assets with a feature value 253H of 0.

According to the example of FIG. 6, a priority score component value 257 of 1 is given to assets with a feature value 253I of 1 and a priority score component value 257 of −2 is given to assets with a feature value 253I of 0.

The priority score component values 257 described with relation to FIG. 6 are exemplary and may be different values according to other embodiments of the technology described herein.

In addition, priority score component values 257 may be changed between collections to better prioritize assets. Priority score component values 257 associated with a particular feature value 253 may be set based on the likelihood that associated feature value 253 may represent a security risk contained within assets. Additionally, or alternatively, priority score component values 257 associated with a particular feature value 253 may be set based on the severity of a security risk indicated by that feature value 253. Priority score component values 257 associated with a particular feature value 253 may also be set based on any other factors. Priority score component values 257 associated with a particular feature value 253 may also be set by security system administrator(s). Priority score component values 257 associated with a particular feature value 253 may also be set by a machine learning method which updates the priority score component values 257 based on previous collections.

According to the example of FIG. 6, after determining priority score component values 257 for all assets, the priority score component values are then summed to determine asset priority scores 258. These prioritized assets 258 may then be used to determine which assets should be recollected in a subsequent collection. In the example of FIG. 6 the prioritized assets may correspond to assets to be recollected in collection 240E of FIG. 3.

Prioritization module 254 may determine the assets to recollect 259 according to various methods. For example, a set number of assets may be recollected with each subsequent recollection, as pictured in FIG. 3, where three assets are recollected in collections 240E and 240F, and in FIG. 6, where the three assets with the highest priority scores are collected.

Alternative methods of determining assets to recollect 259 may include collecting all assets with a priority score above a threshold score, and/or collecting assets with the greatest priority scores until a set collection data volume is reached, among other methods. Some assets may be contained within a predetermined set of assets which are collected with every collection or are not collected, independent of priority scores. Assets to recollect 259 may then be sent to data collection module 221 for subsequent collections.

FIG. 7 is a table which contains asset priority scores and asset priority score component values calculated by an example information security system after a second asset collection, in accordance with some embodiments of the technology described herein. The second collection of FIG. 7 corresponds to collection 240E of FIG. 3, which is based on the data contained in the table of FIG. 6 and is a partial collection. The table of FIG. 7 is arranged in the same format as the table of FIG. 6 and the asset names of FIG. 7 correspond to the same assets of FIG. 6. The priority score component values 257 are determined based on feature values calculated from collection 240E, and the same priority score component values 257 are given to corresponding feature values, as described with relation to FIG. 6.

Arrows 249 are used to demonstrate the direction of change for a particular priority score component value 257, from the priority score component values 257 of FIG. 6.

Changes in priority score component values 257 resulted in changes to priority scores 258, as well as changes to the assets to collect 259, when compared to FIG. 6. The changes to these scores are described below.

Asset 5, Asset 1, and Asset 6 were collected based on the data of FIG. 6, therefore the internal feature values associated with internal features 255 of these assets may change. Assets 1 and 5, both had asset data changes associated with feature value 253A, while Asset 6 did not. This resulted in the priority scores of assets 1 and 5 raising. The feature value 253B for asset audit log activity of Asset 6 was 0, resulting in a lower priority score component value 257 and thus priority score 258. Asset 6 also saw feature values 253E and 253G of 0 for user-based activity and cloud-based log activity, respectively. This resulted in the priority score of Asset 6 dropping to −5 in FIG. 7 from a score of 2 in FIG. 6. This indicates that between time periods D and E. Asset 6 may not be likely to contain any security-related vulnerabilities and therefore it may be less important to collect.

Consequently, Asset 6 is not included in assets to collect 259 of FIG. 7. Instead, Asset 2 is now included in assets to collect 259. Asset 2 was not previously collected and therefore only external feature values associated with external features 256 may change. Asset 2 saw feature values 253E and 253G increase for user-based asset activity and cloud-based log activity, respectively. This resulted in the priority score component values 257 increasing and the asset priority score 258 increasing from −4 in FIG. 6 to −1 in FIG. 7. This score is greater than that of Asset 6, therefore asset 2 is now included in assets to recollect 259. Other changes to asset priority score component values 257 and priority scores 258 are denoted by arrows 249.

Figure 8:
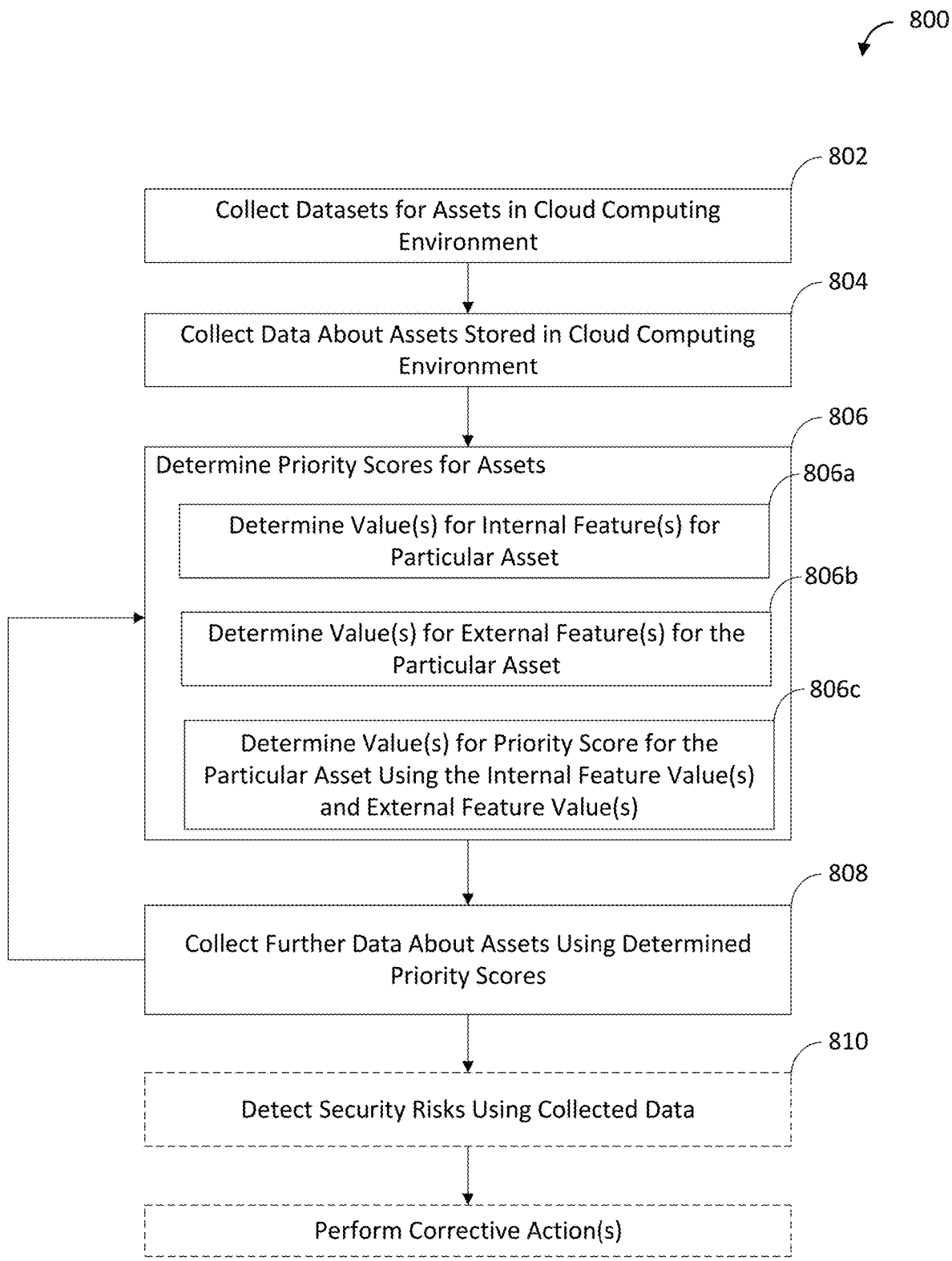
FIG. 8 is a flowchart of an illustrative process 800 for monitoring assets in a cloud computing environment, in accordance with some embodiments of the technology described herein.

FIG. 8 is a flowchart of an illustrative process 800 for monitoring assets in a cloud computing environment, in accordance with some embodiments of the technology described herein. The process 800 may be performed by any suitable computing device. For example, in some embodiments, the process 800 may be performed by information security system 220, aspects of which are described herein including with reference to FIG. 3.

Process 800 begins at act 802, where datasets are collected for the assets being monitored in the cloud computing environment. A dataset for a particular asset may include data stored on the particular asset at one or multiple time points. For example, the dataset for a particular asset may include, for each of one or more time points, at least some (e.g., all) of the data stored on the particular asset. In situations where all the data from an asset is stored that data may have been obtained by collecting an image (sometimes called a "snapshot") of the data stored on the asset. The data part of a dataset may be organized in any suitable format, as aspects of the technology described herein are not limited in this respect. In situations where only some (but not all) of the data is collected from a particular asset, the collected data may be security-related data (examples of which are provided herein); data that is not security-related may not be collected in some embodiments. The data collected for a particular asset, at act 802, may be used to determine the values of one or more "internal" features for the particular asset, as described herein.

Next, process 800 proceeds to act 804, where data about the assets is obtained from the cloud computing environment. These data may be obtained in any suitable way and, for example, may be obtained via application programming interface (API) calls to the cloud computing software. The data collected for a particular asset, at act 804, may be used to determine the values of one or more "external" features for the particular asset as described herein.

Next, process 800 proceeds to act 806, where priority scores for assets being monitored are determined using the data obtained at acts 802 and 804.

As shown in the illustrative example of FIG. 8, first at act 806a, one or more internal feature values may be determined for a particular asset being monitored using the data obtained at act 802. Examples of internal features values are provided herein and include a feature value indicative of a degree of change in data stored by the particular asset at multiple timepoints, a feature value indicative of a degree of change between a base and a subsequent image of the particular asset, a feature value indicative of a degree of audit log activity, and a feature value indicative of a number and/or type of software applications installed on the particular asset. Aspects of how to determine such feature values are described herein including with references to FIGS. 4A, 4B, and 5. Values for any suitable number of internal features may be computed for a particular asset (e.g., values for one, two, three, four, five, etc. internal features may be determined for a particular asset) at act 806a.

Next, at act 806b, one or more external feature values may be determined for each of one or more of the assets being monitored using the data obtained at act 804. Examples of external features values are provided herein and include a feature value indicative of user activity with respect to the particular asset, a feature value indicative of a degree of activity in at least one cloud-based log associated with the particular asset, a feature value indicative of a cloud computing resource type for the particular asset, a feature value indicative of network and/or software configuration of the particular asset; and/or a feature value indicative of a mechanism of deployment of the particular asset. Aspects of how to determine such feature values are described herein including with references to FIGS. 4A, 4B, and 5. Values for any suitable number of external features may be computed for a particular asset (e.g., values for one, two, three, four, five, etc. external features may be determined for a particular asset) at act 806b.

Next, at act 806c, the feature values determined at acts 806a and 806b for a particular asset are used to determine a priority score for that particular asset. In some embodiments, each of the feature values may be converted to a corresponding priority score contribution value and the priority score contribution values may be combined (e.g., added or added using a weighted average) to arrive at the priority score for the particular asset. Converting feature values into priority score contribution values may be performed using a mapping and is described herein including with reference to FIGS. 6 and 7.

The acts 806a-806c may be performed for each of multiple assets being monitored. For example, in some embodiments, the acts 806a-806c may be performed for each of at least 100 assets, at least 1000 assets, at least 10,000 assets, at least 100,000 assets, at least 500,000 assets, at least 1 million assets, at least 5 million assets, at least 10 million assets, between 1000 and 10 million assets.

After the priority scores are calculated at act 806, the priority scores to collect further data about the assets being monitored. In particular, the priority scores may be used to: (1) identifying at least some of the assets (for which further data collection should be performed; and (2) collecting further data about the identified assets.

In some embodiments, identifying a group of assets for which further data is to be collected (both from the assets and from the cloud computing environment) involves identifying assets whose priority scores are above a threshold (e.g., either a pre-set or a dynamically determined threshold). In some embodiments, identifying a group of assets for which further data is to be collected involves identifying the assets having the top k priority scores, where k is an integer (e.g., either a pre-set or a dynamically determined threshold). In some embodiments, the threshold for priority score or the integer k may be set based on the available computing resources (e.g., network resources, processing power) available to collect and process data from assets.

In some embodiments, collecting further data about the identified assets involves collecting, for each particular asset of the identified assets, (1) at least some (e.g., all) of the data stored on the particular asset (e.g., all the data, only the security-related data, etc.); and/or (2) data from the cloud computing environment (e.g., via a call to the API provided by the cloud computing environment).

After further data is collected for the identified assets, at act 808, the process may return to act 806 where the collected data may be used to compute new priority scores for the monitored assets. In turn, the newly computed priority scores may be used to determine one or more assets for which further data should be collected. This aspect of process 800 may proceed iteratively. Each iteration may be performed after the other according to a schedule, adaptively (e.g., upon completion of the previous iteration), or in any other suitable way, as aspects of the technology described herein are not limited in this respect.

After act 808, process 800 may proceed to act 810, where the collected data may be used to identify one or more security risks. Examples of security risks are provided herein.

Next, at act 810, one or more corrective actions may be performed for any one or more of the identified security risks. Examples of corrective actions are provided herein. In some embodiments, the corrective actions may be performed automatically (e.g., by information security system 220). Additionally, or alternatively, one or more users may be notified of the detected security risks. The user(s) may perform at least some (e.g., all) of the corrective actions.

Figure 9:
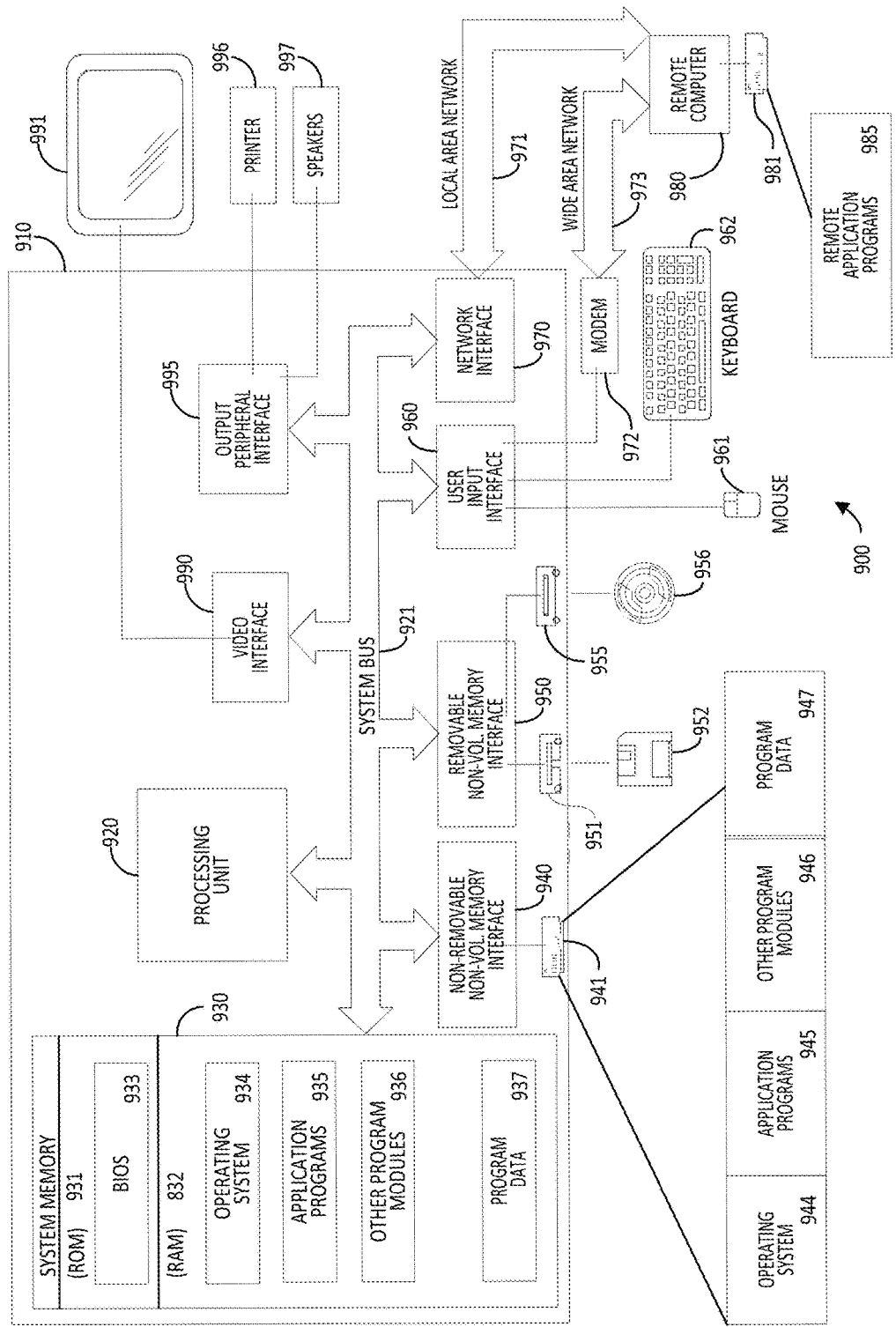
FIG. 9 shows a block diagram of an exemplary computing device, in accordance with some embodiments of the technology described herein.

FIG. 9 shows a block diagram of an exemplary computing device, in accordance with some embodiments of the technology described herein. The computing system environment 900 is only one example of a suitable computing environment and is not intended to suggest any limitation as to the scope of use or functionality of the technology described herein.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the technology described herein includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile or nonvolatile computer storage media. By way of example only, FIG. 9 illustrates a hard disk drive 941 that reads from or writes to non-removable, nonvolatile magnetic media, a flash drive 951 that reads from or writes to a removable, nonvolatile memory 952 such as flash memory, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media described above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. An actor may enter commands and information into the computer 910 through input devices such as a keyboard 962 and pointing device 961, commonly referred to as a mouse, trackball, or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device, or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets, and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the actor input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, a tablet computer, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIG. 8. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for monitoring assets in a cloud computing environment, the method comprising:
   using at least one computer hardware processor to perform:
      collecting a plurality of datasets for a respective plurality of assets in the cloud computing environment, each of the plurality of datasets comprising at least some data stored by a respective one of the plurality of assets at one or multiple timepoints, the plurality of datasets including a first dataset for a first asset in the plurality of assets;
      determining priority scores for the plurality of assets using: (a) feature values determined using data in the plurality of datasets, and (b) feature values determined using data about the plurality of assets and stored in the cloud computing environment, wherein the determining comprises:
         determining, using data in the first dataset that was stored by the first asset at one or more timepoints, at least one first feature value for the first asset;
         determining, using data about the first asset and stored in the cloud computing environment, at least one second feature value for the first asset; and
         determining a priority score for the first asset using the at least one first feature value and the at least one second feature value; and
      collecting further data about at least some of the plurality of assets using the determined priority scores.

2. The method of claim 1, wherein determining the at least one first feature value for the first asset comprises using the first dataset to determine:
   a feature value indicative of a degree of change in data stored by the first asset at multiple timepoints;
   a feature value indicative of a degree of change between a base image of the first asset in the first dataset and a subsequent image of the first asset in the first dataset;

a feature value indicative of a degree of audit log activity; and/or a feature value indicative of a number and/or type of software applications installed on the first asset.

3. The method of claim 2, wherein determining the at least one first feature value for the first asset comprises determining the feature value indicative of the degree of change in the data stored by the first asset at multiple timepoints, wherein the first dataset comprises a first version of the data stored by the first asset at a first timepoint and a second version of the data stored by the first asset at a second timepoint different from the first timepoint, and wherein determining the feature value indicative of the degree of change comprises comparing the first version of the data and the second version of the data.

4. The method of claim 3, wherein the first version of the data comprises first security-related data, wherein the second version of the data comprises second security-related data, and wherein comparing the first version of the data and the second version of the data comprises determining a degree of change between the first security-related data and the second security-related data.

5. The method of claim 2, wherein determining the at least one first feature value for the first dataset comprises determining the feature value indicative of the degree of change between the base image of the first asset in the first dataset and the subsequent image of the first asset in the first dataset, wherein the first dataset comprises the base image and the subsequent image, and wherein determining the feature value indicative of the degree of change between the base image and the subsequent image comprises comparing the base image with the subsequent image.

6. The method of claim 5, wherein the base image comprises first security-related data, wherein the subsequent image comprises second security-related data, and wherein comparing the base image with the subsequent image comprises determining a degree of change between the first security-related data and the second security-related data.

7. The method of claim 2, wherein determining the at least one first feature value for the first dataset comprises determining the feature value indicative of the degree of audit log activity, wherein the first dataset comprises at least one log obtained from the first asset, and wherein determining the degree of audit log activity comprises determining a number of user accesses reflected in the at least one log.

8. The method of claim 2, wherein determining the at least one first feature value for the first dataset comprises determining the feature value indicative of the number and/or the type of software applications installed on the first asset.

9. The method of claim 8, wherein the feature value indicative of the number and/or type of software applications is indicative of whether there are any software applications installed on the first asset with which a user can interact.

10. The method of claim 1, wherein determining the at least one second feature value for the first asset comprises using the data about the first asset and stored in the cloud computing environment to determine:

a feature value indicative of user activity with respect to the first asset;

a feature value indicative of a degree of activity in at least one cloud-based log associated with the first asset;

a feature value indicative of a cloud computing resource type for the first asset;

a feature value indicative of network and/or software configuration of first asset; and/or a feature value indicative of a mechanism of deployment of the first asset.

11. The method of claim 1, wherein determining the at least one second feature value for the first asset comprises determining the feature value indicative of user activity with respect to the first asset.

12. The method of claim 11, wherein determining the feature value indicative of user activity with respect to the first asset comprises determining whether one or more users changed a security configuration of the first asset.

13. The method of claim 10, wherein determining the at least one second feature value for the first asset comprises determining the feature value indicative of the degree of activity in the at least one cloud-based log associated with the first asset, the at least one cloud-based log being part of the data about the first asset and stored in the cloud computing environment.

14. The method of claim 13, wherein the feature value indicative of the degree of activity in the at least one cloud-based log indicates a number and/or type of software packages installed on, modified on, and/or removed from the first asset.

15. The method of claim 10, wherein determining the at least one second feature value for the first asset comprises determining the feature value indicative of the cloud computing resource type for the first asset.

16. The method of claim 15, wherein the first asset is a virtual machine, wherein the feature value indicative of the cloud computing resource type for the first asset indicates whether the virtual machine (VM) launched as a standalone VM resource or as an instance of a group VM resource.

17. The method of claim 16, wherein the group VM resource is an autoscaling group resource, an EKS cluster resource, an ECS cluster resource, or an EMR cluster resource.

18. The method of claim 10, wherein determining the at least one second feature value for the first asset comprises determining the feature value indicative of network and/or software configuration of first asset.

19. The method of claim 10, wherein determining the at least one second feature value for the first asset comprises determining the feature value indicative of the mechanism of deployment of the first asset, wherein the mechanism of deployment of the first asset is manual deployment or automated deployment by cloud-based software.

20. The method of claim 1, wherein the at least one first feature value includes a first plurality of feature values, wherein the at least one second feature value includes a second plurality of feature values, and wherein determining a priority score for the first asset comprises:

determining a priority score contribution value for each feature in the first plurality of feature values and for each feature in the second plurality of feature values; and determining the priority score from the determined priority score contribution values.

21. The method of claim 1, wherein the collecting comprises:
identifying the at least some of the plurality of assets using the determined scores; and
collecting the further data from the at least some of the plurality of assets.

22. The method of claim 1, further comprising:
after collecting further data from at least some of the plurality of assets, analyzing the further data to detect presence of one or more security risks.

23. The method of claim 22, further comprising:
in response to detecting a security risk,
recommending one or more corrective actions to a user, or
automatically taking a corrective action to address the security risk.

24. The method of claim 1,
wherein the plurality of datasets includes a second dataset for a second asset in the plurality of assets, the second asset being different from the first asset, and
wherein determining the priority scores further comprises:
determining, using data in the second dataset that was stored by the second asset at one or more timepoints, at least one third feature value for the second asset;
determining, using data about the second asset and stored in the cloud computing environment, at least one fourth feature value for the second asset; and
determining a priority score for the second asset using the at least one third feature value and the at least one fourth feature value.

25. A system for monitoring assets in a cloud computing environment, the system comprising:
at least one computer hardware processor; and
at least one non-transitory computer-readable storage medium storing processor-executable instructions that, when executed by the at least one computer hardware processor, causes the at least one computer hardware processor to perform a method comprising:
collecting a plurality of datasets for a respective plurality of assets in the cloud computing environment, each of the plurality of datasets comprising at least some data stored by a respective one of the plurality of assets at one or multiple timepoints, the plurality of datasets including a first dataset for a first asset in the plurality of assets;
determining priority scores for the plurality of assets using: feature values determined using data in the plurality of datasets, and feature values determined using data about the plurality of assets and stored in the cloud computing environment, wherein the determining comprises:
determining, using data in the first dataset that was stored by the first asset at one or more timepoints, at least one first feature value for the first asset;
determining, using data about the first asset and stored in the cloud computing environment, at least one second feature value for the first asset; and
determining a priority score for the first asset using the at least one first feature value and the at least one second feature value; and
(C) collecting further data about at least some of the plurality of assets using the determined priority scores.

26. At least one non-transitory computer-readable storage medium storing processor-executable instructions that, when executed by at least one computer hardware processor, causes the at least one computer hardware processor to perform a method for monitoring assets in a cloud computing environment, the method comprising:
collecting a plurality of datasets for a respective plurality of assets in the cloud computing environment, each of the plurality of datasets comprising at least some data stored by a respective one of the plurality of assets at one or multiple timepoints, the plurality of datasets including a first dataset for a first asset in the plurality of assets;
determining priority scores for the plurality of assets using: feature values determined using data in the plurality of datasets, and feature values determined using data about the plurality of assets and stored in the cloud computing environment, wherein the determining comprises:
determining, using data in the first dataset that was stored by the first asset at one or more timepoints, at least one first feature value for the first asset;
determining, using data about the first asset and stored in the cloud computing environment, at least one second feature value for the first asset; and
determining a priority score for the first asset using the at least one first feature value and the at least one second feature value; and
collecting further data about at least some of the plurality of assets using the determined priority scores.

* * * * *